United States Patent [19]
Tatebe et al.

[11] Patent Number: 5,489,382
[45] Date of Patent: Feb. 6, 1996

[54] OXYGENATOR USING POROUS HOLLOW FIBER MEMBRANE

[75] Inventors: Ken Tatebe; Manabu Yamazaki, both of Fuji; Kousuke Kido, Fukuoka, all of Japan

[73] Assignee: Terumo Kabushiki Kaisha, Tokyo, Japan

[21] Appl. No.: 918,786

[22] Filed: Jul. 27, 1992

Related U.S. Application Data

[63] Continuation of Ser. No. 263,281, Oct. 27, 1988, abandoned.

[30] Foreign Application Priority Data

| Oct. 29, 1987 | [JP] | Japan | 62-274758 |
| Mar. 9, 1988 | [JP] | Japan | 63-53841 |
| Mar. 9, 1988 | [JP] | Japan | 63-53842 |

[51] Int. Cl.$^6$ .................................. B01D 69/08
[52] U.S. Cl. .................. 210/321.89; 210/500.23; 210/500.36
[58] Field of Search .................. 428/372, 376, 428/389; 210/500.23, 500.36, 321.89, 352; 264/41, 49; 422/45, 48; 604/4, 26; 96/10, 6

[56] References Cited

U.S. PATENT DOCUMENTS

| 3,577,498 | 5/1971 | Matsuo et al. . | |
| 3,595,738 | 7/1971 | Clarke et al. . | |
| 3,600,271 | 8/1971 | Ono et al. . | |
| 3,651,193 | 3/1972 | Barlow et al. . | |
| 3,710,463 | 1/1973 | Büttner et al. . | |
| 3,904,730 | 9/1975 | Shimizu et al. . | |
| 4,038,357 | 7/1977 | Boyes et al. . | |
| 4,115,620 | 9/1978 | Gupta et al. . | |
| 4,315,819 | 2/1982 | King et al. | 210/321.89 X |
| 4,343,860 | 8/1982 | Fernstrom et al. . | |
| 4,405,686 | 9/1983 | Kuroda et al. . | |
| 4,522,773 | 6/1985 | Menezes et al. . | |
| 4,708,800 | 11/1987 | Ichikawa et al. . | |
| 4,770,852 | 9/1988 | Takahara et al. | 210/500.36 X |
| 5,063,009 | 11/1991 | Mizutani et al. | 210/500.29 X |

FOREIGN PATENT DOCUMENTS

| 0180052 | 7/1983 | European Pat. Off. . |
| 0209465 | 1/1987 | European Pat. Off. . |
| 3003400 | 8/1980 | Germany . |
| 56-52123 | 12/1981 | Japan . |
| 57-194007 | 11/1982 | Japan . |
| 57-54568 | 11/1982 | Japan . |
| 58-03047 | 1/1983 | Japan . |
| 62-155858 | 12/1985 | Japan . |
| 2115425 | 6/1979 | United Kingdom . |
| 2009034 | 12/1985 | United Kingdom . |
| WO88/05475 | 1/1988 | WIPO . |

*Primary Examiner*—Frank Spear
*Attorney, Agent, or Firm*—Burns, Doane, Swecker & Mathis

[57] ABSTRACT

The present invention is directed to an oxygenator using a hydrophobic porous hollow fiber membrane possessing an inside diameter in the range of 150 to 300 microns, a wall thickness in the range of 10 to 150 microns, and a substantially circular cross section, which porous hollow fiber membrane possesses an average crimp amplitude in the range of 35 to 120% of the outside diameter, a maximum crimp amplitude/crimp half cycle period at maximum crimp amplitude ratio in the range of 0.01 to 0.1, and a crimp ratio in the range of 1.0 to 3.0%, and a method for the production thereof.

12 Claims, 4 Drawing Sheets

OXYGENATOR USING POROUS HOLLOW FIBER MEMBRANE

This application is a continuation of application Ser. No. 07/263,281, filed Oct. 27, 1988, now abandoned.

BACKGROUND OF THE INVENTION

1. Field of the Invention

This invention relates to a porous hollow fiber membrane, a method for the production thereof, and an oxygenator using the hollow fiber membrane. More particularly, this invention relates to a porous hollow fiber membrane possessing a high gas-exchange capacity and, at the same time, offering a large available membrane area for the exchange of gas, a method for the production thereof, and an oxygenator using the hollow fiber membrane. Still more particularly, this invention relates to a porous hollow fiber membrane which, no matter whether the oxygenator to be used may be adapted to pass blood inside or outside the hollow fiber membrane, refrains from inflicting damage to the blood cell components or aggravating pressure loss, exhibits high efficiency in establishing gas-liquid contact, suffers from no blood plasma leakage over a protracted service, and manifests a high gas-exchange capacity, a method for the production thereof, and an oxygenator using the hollow fiber membrane.

2. Description of the Prior Art

Generally in the surgical operation of the heart, for example, an oxygenator of hollow fiber membrane is used in the extracorporeal circulation system for the purpose of leading a patient's blood out of his body and adding oxygen to and removing carbon dioxide gas from the blood. The hollow fiber membranes available for the oxygenator of this nature fall under two kinds; homogenous membranes and porous membranes. The homogeneous membranes attain movement of a gas by the molecules of the permeating gas being dissolved and dispersed in the membrane. These homogeneous membranes are represented by silicone rubber (commercialized by Senkouika Kogyo under trademark designation of "Mella-Silox," for example). In the homogeneous membranes, the silicone rubber membrane is the only product that has been heretofore accepted as practicable from the standpoint of gas permeability. The silicone rubber membrane is not allowed to have any smaller wall thickness than 100 μm on account of limited strength. Thus, it has a limited capacity for permeation of gas and it is particularly deficient in the permeation of carbon dioxide gas. Moreover, the silicone rubber has a disadvantage in that it is expensive and low in fabricability.

By contrast, in the porous membranes, since the micropores possessed by the membrane are notably large as compared with the molecules of a gas to be permeated, the gas passes through the micropores in the form of volume flow. Various oxygenators using a microporous polypropylene membrane have been proposed. It has been proposed, for example, to produce porous polypropylene hollow fibers by melt spinning polypropylene through hollow fiber producing nozzles at a spinning temperature in the range of 210° to 270° C. at a draft ratio in the range of 180 to 600, then subjecting the resultant hollow threads of polypropylene to a first heat treatment at a temperature not exceeding 155° C., stretching the heated hollow threads by a ratio in the range of 30 to 200% at a temperature not exceeding 110° C., and thereafter subjecting the stretched hollow threads to a second heat treatment at a temperature exceeding that of the first heat treatment and not exceeding 155° C. (Japanese Patent Publication SHO 56(1981)-52,123). These porous hollow fibers obtained by the method just mentioned are physically caused to form micropores therein by the hollow threads of polypropylene being stretched. These micropores, therefore, are linear micropores extending substantially perpendicularly horizontally relative to the wall thickness proportionately to the degree of stretching while forming cracks in the axial direction of the hollow fiber. Thus, they have a cross section of the shape of a slit. Further, the micropores run substantially linearly and continuously through the wall thickness and occur in a high void ratio. The porous hollow fibers, therefore, have a disadvantage in that they have high permeability to steam and, after a protracted use for extracorporeal circulation of blood, they suffer from leakage of blood plasma.

As a porous membrane incapable of blood plasma leakage, for example, there has been proposed a porous polyolefin hollow fiber membrane which is produced by mixing a polyolefin, an organic filler uniformly dispersible in the polyolefin in the molten state thereof and easily soluble in a liquid extractant to be used, and a crystal seed forming agent, melting the resultant mixture, discharging the molten mixture through annular spinning nozzles and, at the same time, introducing an inert gas into the inner cavities of the spun tubes of the molten mixture, causing the resultant hollow threads to contact a cooling and solidifying liquid incapable of dissolving the polyolefin thereby cooling and solidifing the hollow threads, then bringing the cooled and solidified hollow threads into contact with a liquid extractant incapable of dissolving the polyolefin thereby extracting the organic filler from the hollow threads (Japanese Patent Application SHO 59(1984)-210,466). The polypropylene hollow fiber membrane which, as one species of the hollow fiber membranes, is produced by using as a cooling and solidifying liquid a specific cooling and solidifying liquid heretofore favorably utilized on account of the ability thereof to dissolve the organic filler does not suffer from blood plasma leakage because the pores formed therein are small in diameter and complicated in pattern of channel. Since this membrane has a small pore density per unit area, it has a possibility of exhibiting a gas-exchange capacity insufficient for the membrane to be used effectively in an oxygenator. It also has another possibility that the low molecular component of the polyolefin will mingle into the cooling and solidifying liquid capable of dissolving the organic filler and eventually adhere to the inner wall of the cooling bath tube and cause deformation of the shape of hollow fiber with elapse of time.

To overcome the impact of such a drawback as mentioned above, there has been proposed a porous polyolefin hollow fiber membrane which is produced by mixing polypropylene, an organic filler uniformly dispersible in the polypropylene in the molten state thereof and readily soluble in a liquid extractant to be used, and a crystal seed forming agent, melting the resultant mixture and discharging the molten mixture through annular spinning nozzles into hollow threads, allowing the hollow threads to contact a liquid made of the organic filler or a similar compound thereby cooling and solidifying the hollow threads, then bringing the cooled and solidified hollow threads into contact with a liquid extractant incapable of melting the propylene thereby extracting the organic filler from the hollow threads (Japanese Patent Application SHO 61(1986)-155,159). The hollow fiber membrane produced by this method is free from the drawbacks described so far. During the course of the cooling, however, the organic filler or the cooling and solidifying liquid remains locally on the outermost surface of hollow fibers before these hollow fibers are thoroughly cooled and solidified and the compositional proportion of polypropylene is lower in the outermost surface than elsewhere in the entire wall thickness and, as a result, the pores in the outer surface of hollow fiber are large and the propylene particles are interconnected in the pattern of a network and distributed in a heavily rising and falling state. The hollow fibers of this nature pose no problem whatever when they are used in an oxygenator of the type adapted to effect addition of oxygen to blood and removal of carbon dioxide gas therefrom by flowing the blood inside the hollow fibers and blowing an oxygen-containing gas outside the hollow tubes.

When the hollow fibers are used in an oxygenator of the type adapted to effect the same functions by flowing blood outside the hollow fibers and blowing the oxygen-containing gas inside the hollow fibers, however, they have a disadvantage that the aforementioned behavior of the outer surface inflict damage to the blood cell components and aggravate the pressure loss. The hollow fiber membrane, without reference to the type of oxygenator, has a disadvantage that the work of assembling the hollow fibers into the oxygenator neither proceeds efficiently nor produces a desirable potting because the adjacent hollow fibers coalesce.

In the case of the oxygenator which is formed of the porous hollow fiber membranes obtained as described above and is operated by circulating blood outside the hollow fiber membranes and blowing an oxygen-containing gas inside the hollow fiber membranes, if the gaps between the adjacent hollow fibers are narrow and substantially uniform in width throughout the entire length of hollow fibers, the air or the oxygen-containing gas is liable to stagnate easily in these gaps because of the hydrophobicity of the hollow fiber membranes. If the stagnation of the air or the oxygen-containing gas or the so-called phenomenon of air trap arises in the gaps between the adjacent hollow fibers, it impairs the flow of blood and entails a disadvantage that the clusters of the entrapped air or oxygen-containing gas obstruct the blood from gaining access to the air or oxygen-containing gas through the hollow fiber membranes, lend themselves to descreasing the available membrane area, and degrade the oxygenator's gas-exchange capacity.

An object of this invention, therefore, is to provide an improved porous hollow fiber membrane, a method for the production thereof, and an oxygenator using the hollow fiber membrane. Another object of this invention is to provide a porous hollow fiber membrane possessing a high gas-exchange capacity and, at the same time, offering a large available membrane area for exchange of gas, a method for the production thereof, and an oxygenator using the hollow fiber membrane. A further object of this invention is to provide a porous hollow fiber membrane of polypropylene which, without reference to the type of oxygenator, refrains from inflicting damage to the blood cell components and aggravating the pressure loss, entails no blood plasma leakage over a protracted service, experiences no decline of the gas-exchange capacity due to the air trap, exhibits a high gas-exchange capacity, and warrants-favorable use in an oxygenator using the hollow fiber membrane. Yet another object of this invention is to provide a porous hollow fiber membrane possessing a smooth outer surface and defying coalescence of the adjacent hollow fibers during the assembly of an oxygenator, a method for the production thereof, and an oxygenator using the hollow fiber membrane.

SUMMARY OF THE INVENTION

The objects mentioned above are accomplished by a hydrophobic porous hollow fiber membrane possessing an inside diameter in the range of 150 to 300 microns, a wall thickness in the range of 10 to 150 microns, and a substantially circular cross section, which porous hollow fiber membrane possesses an average crimp amplitude in the range of 35 to 120% of the outside diameter, a maximum crimp amplitude/crimp half cycle period at maximum crimp amplitude ratio in the range of 0.01 to 0.1, and a crimp ratio in the range-of 1.0 to 3.0%.

This invention also discloses a porous hollow fiber membrane wherein the void ratio is in the range of 5 to 60%. This invention further discloses a porous hollow fiber membrane wherein the oxygen gas flux is in the range of 0.1 to 2,000 $l/min.m^2.atm$. This invention discloses a porous hollow fiber membrane wherein the inside diameter is in the range of 180 to 250 μm and the wall thickness is in the range of 20 to 100 μm. This invention also discloses a porous hollow fiber membrane which is made of polypropylene. This invention further discloses a porous hollow fiber membrane wherein the average crimp amplitude is in the range of 50 to 100% of the outside diameter, the maximum crimp amplitude/crimp half cycle period at maximum crimp amplitude ratio is in the range of 0.02 to 0.05, and the crimp ratio is in the range of 2.0 to 3.0%.

This invention discloses a hydrophobic porous hollow fiber membrane which is a porous hollow fiber membrane of a polyolefin. This invention also discloses a porous hollow fiber membrane wherein minute polyolefin particles are intimately are bound and allowed to form a tightly packed layer on the inner surface side of the hollow fiber membrane, minute polyolefin particles are bound after the pattern of chains and allowed to form a porous layer on the outer surface side of the hollow fiber membrane, and very small through holes are formed in the hollow fiber membrane as extended from the inner surface side to the outer surface side.

This invention further discloses a porous hollow fiber membrane wherein the average crimp amplitude is in the range of 50 to 100% of the outside diameter, the maximum crimp amplitude/crimp half cycle period at maximum crimp amplitude ratio is in the range of 0.02 to 0.05, and the crimp ratio is in the range of 2.0 to 3.0%.

This invention discloses a porous hollow fiber membrane wherein the solid phase in the inner surface of the hollow fiber membrane has polypropylene particles partly exposed through the surface and preponderantly fused and bound intimately to give rise to a continuous phase, the solid layer in the interior through the outer surface of the membrane has polypropylene particles arranged in the axial direction of fiber to give rise to a multiplicity of polypropylene clusters, and the gaps between the solid phases are interconnected in the form of a three-dimensional network to give rise to through holes.

This invention also discloses a porous hollow fiber membrane wherein the polypropylene particles have an average particle diameter in the range of 0.1 to 2.0 microns and an average pore diameter in the inner surface in the range of 0.1 to 1.0 micron. This invention further discloses a porous hollow fiber membrane which, when used in an oxygenator, is substantially free from leakage of blood plasma and decline of gas-exchange capacity within 30 hours of service.

This invention discloses a porous hollow fiber membrane which, when used in an oxygenator, inflicts damage sparingly on blood cell components. This invention discloses a porous hollow fiber membrane wherein the average crimp amplitude is in the range of 50 to 100% of the outside diameter, the maximum crimp amplitude/crimp half cycle period at maximum crimp amplitude is in the range of 0.02 to 0.05, and the crimp ratio is in the range of 2.0 to 3.0%.

The objects mentioned above are also accomplished by a method for the production of a porous hollow fiber membrane, which is characterized by mixing a polyolefin, an organic filler uniformly dispersible in the polyolefin in the molten state thereof and easily soluble in a liquid extractant to be used, and a crystal seed forming agent, melting the resultant mixture and discharging the molten mixture through annular spinning nozzles into hollow threads, allowing the hollow threads to contact a cooling and solidifying liquid incapable of dissolving the polyolefin thereby cooling and solidifying the hollow threads, then bringing the resultant cooled and solidified hollow threads into contact with the liquid extractant incapable of dissolving the polyolefin thereby extracting the organic filler from the hollow threads, and thermally crimping the hollow threads thereby forming porous hollow fiber membranes possessing an average crimp amplitude in the range of 35 to 120% of the outside diameter, a maximum crimp amplitude/crimp half cycle period at maximum crimp amplitude ratio in the range of 0.01 to 0.1, and a crimp ratio in the range of 1.0 to 3.0%.

This invention discloses a method for the production of a porous hollow fiber membrane wherein the crimp is formed by causing the produced hollow fiber membrane to be cross wound on a bobbin and then heat set. This invention also discloses a method for the production of a porous hollow fiber membrane wherein the heat setting is carried out at a temperature in the range of 50° to 100° C. for a period in the range of 2 to 48 hours. This invention further discloses a method for the production of a porous hollow fiber membrane wherein the polyolefin is polypropylene. This invention discloses a method for the production of a porous hollow fiber membrane wherein the organic filler is a hydrocarbon having a boiling point exceeding the melting point of the polyolefin. This invention also discloses a method for the production of a porous hollow fiber membrane wherein the hydrocarbon is liquid paraffin or an α-olefin oligomer.

This invention further discloses a method for the production of a porous hollow fiber membrane wherein the amount of the organic filler to be incorporated therein is in the range of 35 to 170 parts by weight, based on 100 parts by weight of the polyolefin. This invention discloses a method for the production of a porous hollow fiber membrane wherein the crystal seed forming agent is an organic heat-resistant substance possessing a melting point exceeding 150° C. and a gelling point exceeding the crystallization initiating point of the polyolefin to be used. This invention also discloses a method for the production of a porous hollow fiber membrane wherein the amount of the crystal seed forming agent to be incorporated therein is in the range of 0.1 to 5 parts by weight, based on 100 parts by weight of the polyolefin.

This invention further discloses a method for the production of a porous hollow fiber membrane wherein the cooling and solidifying liquid possesses a specific heat capacity in the range of 0.3 to 0.7 cal/g. This invention discloses a method for the production of a porous hollow fiber membrane wherein the cooling and solidifying liquid is silicone oil or polyethylene glycol. This invention also discloses a method for the production of a porous hollow fiber membrane wherein the polydimethyl siloxane possesses a viscosity in the range of 2 to 50 cSt at 20° C. This invention further discloses a method for the production of a porous hollow fiber membrane wherein the polyethylene glycol possesses an average molecular weight in the range of 100 to 400.

This invention discloses a method for the production of a porous hollow fiber membrane wherein the organic filler is liquid paraffin. This invention also discloses a method for the production of a porous hollow fiber membrane wherein the amount of the organic filler to be incorporated therein is in the range of 35 to 170 parts by weight, based on 100 parts by weight of polypropylene.

This invention further discloses a method for the production of a porous hollow fiber membrane wherein the crystal seed forming agent is an organic heat-resistant substance possessing a melting point exceeding 150° and a gelling point exceeding the crystallization initiating point of the polypropylene to be used. This invention discloses a method for the production of a porous hollow fiber membrane wherein the amount of the crystal seed forming agent to be incorporated therein is in the range of 0.1 to 5 parts by weight, based on 100 parts by weight of the polypropylene to be used.

The objects mentioned above are further accomplished by an oxygenator provided with hollow fiber membranes as gas-exchange membranes, which oxygenator is characterized by using hydrophobic porous hollow fiber membranes as gas-exchange membrane.

EXPLANATION OF PREFERRED EMBODIMENT

Figure 1:
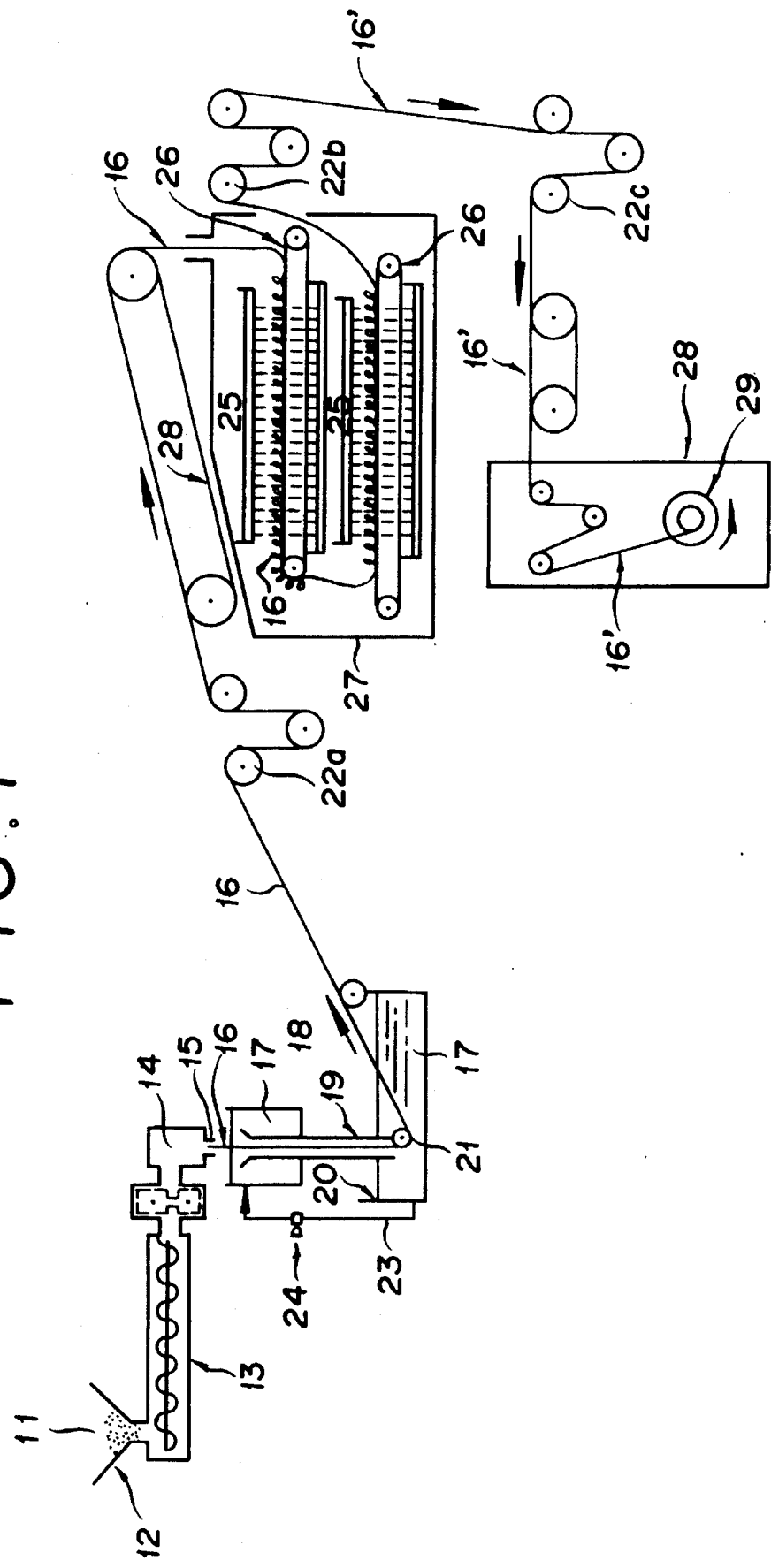
FIG. 1 is a schematic cross section of an apparatus to be used in the method for the production of porous hollow fiber membrane contemplated by the present invention.

The porous hollow fiber membrane of the present invention is a hydrophobic porous hollow fiber membrane possessing an inside diameter in the range of 150 to 300 microns, preferably 180 to 250 microns, a wall thickness in the range of 10 to 150 microns, preferably 20 to 100 microns, and a substantially circular cross section, which porous hollow fiber membrane is characterized by possessing an average crimp amplitude in the range of 35 to 120%, preferably 50 to 100%, of the outside diameter, a maximum crimp amplitude/crimp half cycle period at maximum crimp amplitude ratio in the range of 0.01 to 0.1, preferably 0.02 to 0.05, and a crimp ratio in the range of 1.0 to 3.0%, preferably 2.0 to 3.0%.

In the porous hollow fiber membrane of this invention, the average crimp amplitude is defined by the range of 35 to 120% of the outside diameter for the following reason. If the average crimp amplitude is less than 35% of the outside diameter, there arises the possibility that when porous hollow fiber membranes are incorporated in an oxygenator, the gaps allowed to intervene between the adjacent hollow fibers are not amply large and are liable to entail ready stagnation of air or an oxygen-containing gas therein. Conversely, if the average crimp amplitude exceeds 120% of the outside diameter, the disadvantage ensues that the gaps allowed to intervene between the individual hollow fibers during the incorporation of the porous hollow fiber membrane into the oxygenator cannot be easily retained in a size falling within a prescribed range.

The maximum crimp amplitude/crimp half cycle period at maximum crimp amplitude ratio is defined by the range of 0.01 to 0.1 for the following reason. If the maximum crimp amplitude/crimp half cycle period at maximum crimp amplitude ratio is less than 0.01, there similarly arises the possibility that when porous hollow fiber membranes are incorporated in an oxygenator, the gaps allowed to intervene between the adjacent hollow fibers are not amply large and are liable to entail ready stagnation of air or an oxygen-containing gas therein. Conversely, if the maximum crimp amplitude/crimp half cycle period at maximum crimp amplitude ratio exceeds 0.1, the disadvantage ensues that the gaps allowed to intervene between the individual hollow fibers during the incorporation of the porous hollow fiber membranes into the oxygenator are susceptible to larger variation in size than is tolerable and the flow of blood passed through the gaps suffers from heavy pressure loss.

The crimp ratio is also defined by the range of 1.0 to 3.0% for the following reason. If the crimp ratio is less than 1.0%, the gaps allowed to intervene between the individual hollow fibers during the incorporation of the porous hollow fiber membranes into the oxygenator are not fully effectively augmented by crimping. Conversely, if the crimp ratio exceeds 3.0%, the possibility ensues that the oxygenator produced as a module by the use of the porous hollow fiber membranes assumes a larger size than is tolerable.

So long as the porous hollow fiber membrane of this invention possesses the attributes described above, the methods for manufacture, specifically for crimping and for impartation of porosity are irrelevant. Such a porous hollow fiber membrane as satisfying the requirement may be obtained, for example, by preparing a hollow fiber membrane spun out and vested with a porous texture by the stretching method or the extraction method, cross winding it on a suitable bobbin, and heat treating the resultant roll of hollow fiber membrane approximately under the conditions of 60° C. and 18 hours thereby setting the hollow fiber membrane in the crimped state. If the thermal setting aimed at the impartation of crimp is performed more than is necessary and the texture of membrane is consequently altered and specifically the void ratio existing before the crimping is lowered in a ratio of more than 60% under the impact of the heat treatment, then the thermal setting fails to manifest the effect thereof sufficiently. If the thermal setting is insufficient and the hollow fiber membrane which retains the crimped state desirably during the course of module assembly is consequently suffered to lose crimp under the tension subsequently exerted thereon by the residual stress, then the thermal setting does not manifest the effect thereof as expected.

The porous hollow fiber membrane of the present invention can be expected, when it is used in an oxygenator, to manifest the effect thereof more advantageously when it possesses a void ratio in the range of 5 to 60% and an oxygen gas flux in the range of 0.1 to 2,000 l/min.m².atm., preferably 100 to 1,500 l/min.m².atm. If the void ratio is less than 10%, there arises the possibility that the porous hollow fiber membrane is deficient in gas-exchange capacity. Conversely, if the void ratio exceeds 60%, the porous hollow fiber membrane has the possibility of entailing leakage of blood plasma.

If the opening ratio is less than 10%, there is the possibility that the formation of through holes in the void parts of the hollow fiber membrane does not take place sufficiently and the porous hollow fiber membrane betray deficiency in gas-exchange capacity. Conversely, if the opening ratio exceeds 30%, the through holes are deprived of necessary complexity of pattern and the porous hollow fiber membrane is susceptible of blood plasma leakage.

If the oxygen gas flux deviates from the range of 100 to 1,500 lit/min.m².atm, there arises the possibility that the porous hollow fiber membrane fails to fulfil the function as a gas-exchange membrane. The polypropylene particles and the through holes or the gaps between the particles with jointly constitute the porous hollow fiber membrane of the present invention can be regulated in size and degree of distribution under desirable conditions.

The average particle diameter of the polypropylene particles is desired to be in the range of 0.1 to 2.0 μm, preferably 0.2 to 1.5 μm, and the average diameter of the pores in the inner surface is desired to be in the range of 0.1 to 1.0 μm, preferably 0.3 to 0.6 μm.

The materials available for the construction of the porous hollow fiber membrane of the present invention include hydrophobic synthetic -resins represented by such, polyolefins as polypropylene and polyethylene and polytetrafluoroethylene, for example. Among other hydrophobic synthetic resins mentioned above, polypropylene is particularly advantageous in excelling in various properties such as mechanical strength, thermal stability, and fabricability and permitting easy impartation of porosity.

The cross-sectional configuration of the hollow fiber membrane is variable in some measure with the production conditions used for the hollow fiber membrane. Generally, very small polyolefin particles are closely bound to form a tightly packed layer on the inner surface side and similarly small polyolefin particles are bound after the pattern of chains to form a porous layer on the outer surface side and very thin through holes are formed as extended from the inner surface side to the outer surface side. Though the microstructure of the hollow fiber membrane made of polypropylene is variable with the production conditions used for the hollow fiber membrane, it generally assumes the following pattern where, as the cooling and solidifying liquid, there is used a solution which shows no compatibility with an organic filler and possesses a specific heat capacity in the range of 0.3 to 0.7 cal/g. Specifically on the inner surface side, the solid phase has polypropylene particles partly exposed from the surface and preponderantly fused and bound intimately, namely fused and then cooled and solidified to give rise to a continuous phase.

In the interior of the membrane, the solid phase is formed of numerous polypropylene particles, which are randomly dispersed without any directionally in the circumferential direction and are mutually bound to form clusters in the axial direction of fiber. These polypropylene clusters are interconnected through the medium of polypropylene fibrils. In the interior of the membrane, therefore, the solid phase is thought to be formed of a host of polypropylene clusters which are each composed of polypropylene particles linked in the axial direction of fiber. In the outer surface similarly to the interior of the membrane, the solid phase is formed by the aggregation of a multiplicity of polypropylene clusters each similarly composed of polypropylene particles linked in the axial direction of fiber.

The gaps intervening between such solid phases, in the wall thickness of the hollow fiber inclusively of the inner surface and the outer surface, form long paths extending from the inner surface to the outer surface. These pores are not extended linearly but continued reticularly in a complicated pattern to give rise to a three-dimensional network of through holes. This complexity of the through holes in distribution is evinced by the fact that the porous hollow fiber membrane of this invention possesses an extremely low birefringence ratio in the range of 0.001 to 0.01 in the axial direction of fiber and a small orientation of polypropylene crystals.

In the porous hollow fiber membrane of the present invention, the inner surface assumes desirable quality including smoothness because it comprises polypropylene particles which are partially exposed from the surface and proponderantly fused and bound closely to form a continuous phase and void portions which occupy the remaining matrix as described above. When this porous hollow fiber membrane is used in an oxygenator in such a manner as to pass blood through the inner cavity thereof, it neither inflicts any damage to the blood cell components nor aggravates pressure loss. The outer surface thereof similarly assumes desirable surface quality inclusive of smoothness because it comprises a solid phase of a multiplicity of polypropylene clusters each composed of polypropylene particles orderly arranged in the axial direction of fiber and void portion occupying the remaining matrix.

When the porous hollow fiber membrane is used in an oxygenator in such a manner as to pass blood outside the hollow fiber, it neither inflicts any damage to the blood cell components nor aggravates pressure loss. Further, the pores of the porous hollow fiber membrane which serve as routes for passage of gas while the membrane is used in the oxygenator are formed of a three-dimensional network of through holes connected reticularly in a complicated pattern. No matter whether the blood for extracorporeal circulation is passed inside or outside the hollow fiber membrane, the blood plasma component is not allowed to pass through the long complicated rough routes offered by the pores. For instance, in the case of the extracorporeal circulation for 30 hours, it is observed neither occurrence of blood plasma leakage nor substantially decreasing the gas-exchange capacity.

Further, the porous hollow fiber membrane of this invention is, as described below, effected to thermal crimping, after offering it porosity by means of extracting, to obtain a crimped porous hollow fiber membrane treated with crimping without changing any features as described above, which membrane possesses an average crimp amplitude in the range of 35 to 120%, preferably 50 to 100%, of the outside diameter, a maximum crimp amplitude/crimp half cycle period at maximum crimp amplitude ratio in the range of 0.01 to 0.1, preferably 0.02 to 0.05, and a crimp ratio in the range of 1.0 to 3.0%, preferably 2.0 to 3.0%.

The treatment with crimping as described above has following advantage. For example, when an oxygenator which is formed of such porous hollow fiber as treated above is operated by circulating blood outside the hollow fiber membrane, while blowing an oxygen-containing gas inside the hollow fiber in the oxygenator, since gaps between the hollow fibers are relatively large and varied within a prescribed range over front and rear sides thereof in spite of the hollow fiber being hydrophobic, the air or oxygen-containing gas is hardly suffered to stagnate in the gaps. Thus, the hollow fiber membrane ensures satisfactory flow of blood and uniform contact of the blood with the oxygen-containing gas throughout the entire surface of the hollow fiber membrane. The hollow fiber membrane, therefore, manifests the gas-exchange capacity very efficiently.

The method for the production of a porous hollow fiber membrane contemplated by this invention is characterized by mixing a polyolefin, an organic filler uniformly dispersible in the polyolefin in the molten state thereof and easily soluble in a liquid extractant to be used, and a crystal seed forming agent, melting the resultant mixture and discharging the molten mixture through an annular spinning nozzle, allowing the discharged hollow thread to contact a cooling and solidifying liquid thereby cooling and solidifying the hollow thread, bringing the cooled and solidified hollow thread into contact with the liquid extractant incapable of dissolving the polyolefin thereby extracting the organic filler from the hollow thread, and thermally crimping the resultant hollow fiber membrane thereby forming a porous hollow fiber membrane possessing an average crimp amplitude in the range of 35 to 120% of the outside diameter, a maximum crimp amplitude/crimp half cycle period at maximum crimp amplitude ratio in the range of 0.01 to 0.1, and a crimp ratio in the range of 1.0 to 3.0%.

The porous hollow fiber membrane of polyolefin which is obtained by causing the organic filler incorporated in the molten dope as the raw material to be cooled and solidified and subsequently extracted therefrom with the liquid extractant as described above acquires a texture such that, as disclosed in Japanese Patent Laid-Open SHO 61(1986)-90, 705, the inner surface side thereof has very small polyolefin particles closely bound to form a tightly packed layer and the outer surface side thereof has very small polyolefin particles connected after the pattern of chains to form a porous layer, with very thin through holes formed as extended from the inner surface side to the outer surface side. Since the pores are so minute and so complicated in distribution that the porous hollow fiber membrane acquires high permeability to gas and, at the same time, refrains from inducing the problem of blood plasma leakage.

When the porous hollow fiber membrane of this texture is vested with crimps of a prescribed ratio as described above and the oxygenator produced by incorporating therein the porous hollow fiber membrane is operating by circulating blood outside the hollow fiber membrane and blowing an oxygen-containing gas inside the hollow fiber membrane, the oxygen-containing gas such as air is hardly suffered to stagnate in the gaps and the blood is passed very smoothly and the blood and the oxygen-containing gas are brought into uniform contact throughout the entire surface of the hollow fiber membrane because the crimps of the description given above serve the purpose of interposing relatively large gaps between the adjacent hollow fibers and imparting alterations within a stated range to the hollow fibers throughout the whole length thereof. Thus, the porous hollow fiber membrane enjoys a very satisfactory gas-exchange capacity.

Now, the present invention will be described more specifically below with reference to embodiments thereof.

FIG. 1 is a schematic diagram illustrating a method for the production of a porous hollow fiber membrane of the present invention. In the embodiment illustrated in FIG. 1, a mixture 11 comprising a polyolefin, an organic filler, and a crystal seed forming agent is fed through a hopper 12 to a kneader such as, for example, a single-screw extruder 13, there to be melted and kneaded and extruded. The extruded mixture is forwarded to a spinning device 14 and discharged through an annular spinning nozzle (not shown) of a spinneret 15 into a gaseous atmosphere such as, for example, air.

A hollow tread 16 emanating from the annular spinning nozzle is introduced into a cooling tank 18 containing a cooling and solidifying liquid 17 and cooled and solidified/by being brought into contact with the cooling and solidifying liquid 17. In this case, the contact between the hollow thread 16 and the cooling and solidifying liquid 17 is desired to be established by causing the cooling and solidifying liquid 17 to flow down the interior of a cooling and solidifying liquid passing tube 19 disposed as thrust downwardly through the bottom of the cooling tank 18 and allowing the hollow thread 16 to come into parallel contact with the flow of the cooling and solidifying liquid, for example, as illustrated in FIG. 1.

The descending cooling and solidifying liquid 17 is received and stored in a solidifying tank 20. Inside the solidifying tank 20, the hollow thread 16 introduced therein is caused to change the direction of its travel by a direction changing bar 21 so as to be amply exposed to the cooling and solidifying liquid 17 and consequently solidified. The cooling and solidifying liquid 16 which accumulates in the solidifying tank 20 is discharged through a circulating line 23 and returned by a circulating pump 24 to the cooling tank 18. Then, the solidified hollow thread 16 is guided by drive rolls 22a to a shower-conveyor type extruding machine 27 adapted to let a liquid extractant capable of dissolving the organic solvent and incapable of dissolving polypropylene fall in the form of shower.

While the hollow thread 16 is being conveyed on the belt conveyor 26 in the extruding machine 27, it is brought into ample contact with the liquid extractant 25 and deprived of the residual organic filler through extraction and consequently transformed into a hollow fiber membrane 16. The hollow fiber membrane 16' led out of the extruding machine 27 by drive rolls 22b is optionally passed through the steps of re-extraction and drying (not shown) and then guided by drive rolls 22c to a winding device 28 and, in this winding device 28, cross wound on a bobbin 29. Further, the hollow fiber membrane 16' taken up on the bobbin 29 is subjected to a heat treatment under suitable conditions to be set in a crimped state.

The species of polypropylene available as the raw material in the present invention include propylene homopolymer, ethylene homopolymer, and block polymers using propylene as a main component and incorporating other monomers therein, for example. The polyolefin to be used is desired to possess a melt index (M.I.) in the range of 5 to 70, preferably 10 to 40. Among other polyolefins mentioned above, propylene homopolymer is usable particularly advantageously. The propylene homopolymer is desired to possess as high crystallinity as possible.

The organic filler is required to be uniformly dispersible in the polyolefin while the polyolefin is in the molten state thereof and easily soluble in the liquid extractant as specifically described later on. The organic fillers answering the description include liquid paraffins (number average molecular weight 100 to 2,000), α-olefin oligomers [such as, for example, ethylene oligomers (number average molecular weight 100 to 2,000), propylene oligimers (number average molecular weight 100 to 2,000), and ethylene-propylene oligomers (number average molecular weight 100 to 2,000)], paraffin waxes (number average molecular weight 200 to 2,500), and various hydrocarbons. Among other organic fillers mentioned above, liquid paraffins prove advantages.

The mixing ratio of the polypropylene to the organic filler is desired to be such that the amount of the organic filler is in the range of 35 to 170 parts by weight, preferably 80 to 150 parts by weight, based on 100 parts by weight of the polypropylene. If the amount of the organic filler is less than 35 parts by weight, the produced porous hollow fiber membrane possesses no ample permeability to gas. Conversely, if the amount exceeds 170 parts by weight, the produced mixture possesses too low viscosity to be efficiently molded into a hollow thread.

The raw materials are prepared (designed) by the premix method which comprises melting and kneading the mixture of the prescribed percentage composition by the use of an extruder such as, for example, a twin-screw extruding machine, extruding the resultant molten blend, and then pelletizing the extruded blend.

The crystal seed forming agent to be in the raw material for this invention is an organic heat-resistant substance possessing a melting point exceeding 150° C. (preferably falling in the range of 200° to 250° C.) and a gelling point exceeding the crystallization initiating point of the polyolefin to be used. The crystal seed forming agent is incorporated for the sake of diminishing the polyolefin particles in size, reducing the gaps between the adjacent particles namely the through holes in thickness, and heightening the pore density. The crystal seed forming agents available herein include 1,3,2,4-dibenzylidene sorbitol, 1,3,2,4-bis(p-methylbenzylidine) sorbitol, 1,3,2,4,-bis(p-ethylbenzylidene)-sorbitol, bis(4-t-butylpheny) sodium benzoate, adipic acid, talc, and kaolin, for example.

Among other crystal seed forming agents mentioned above, benzylidene sorbitol and particularly 1,3,2,4-bis(p-ethylbenzylidene)sorbitol and 1,3,2,4-bis(p-methylbenzyliden)sorbitol are advantageous in being dissolved out sparingly into blood.

The mixing ratio of the polypropylene to the crystal seed forming agent is desired to be such that the amount of the crystal seed forming agent is in the range of 0.1 to 5 parts by weight, preferably 0.2 to 1.0 parts by weight, based on 100 parts by weight of the polypropylene.

The mixture prepared as the raw material as described above is further melted and kneaded by the use of an extruder such as, for example, a single screw extruder, at a temperature in the range of 160° to 250°, preferably 180° to 220° C. and discharged, optionally by use of a gear pump of high metering accuracy, into the gaseous atmosphere through the annular nozzle of the spinning device to give rise to a hollow thread. The central part inside the annular nozzle may be caused to inhale spontaneously such a gas as nitrogen, carbon dioxide gas, helium, argon, or air or to introduce the gas forcibly. Then, the hollow thread discharged through the annular nozzle is let fall and subsequently brought into contact with the cooling and solidifying liquid in the cooling tank. The distance of this descent of the hollow thread is desired to be in the range of 5 to 1,000 mm, preferably 10 to 500 mm. This range is critical. If the distance of fall is less than 5 mm, the falling hollow thread is pulsated and possibly crushed at the moment of the entry thereof in the cooling and solidifying liquid. Inside the cooling tank, the hollow thread has not yet been thoroughly solidified and is susceptible of deformation under the external force because it contains a gas in the cavity thereof. The hollow thread 16 can be forcibly moved and, at the same time, prevented from being deformed under the external force (such as the pressure of fluid) by allowing the cooling and solidifying liquid 17 to flow down the interior of the cooling and solidifying liquid passing tube 19 disposed as thrust downwardly through the bottom of the cooling tank 18 and allowing the hollow' thread 16 to come into parallel contact with the downward flow of the cooling and solidifying liquid, for example, as illustrated in FIG. 1. As regard the flow rate of the cooling and solidifying liquid in this case, that which is attained by spontaneous flow is sufficient. At this time, the cooling temperature is desired to be in the range of 10° to 90° C., preferably 20° to 75° C. If this cooling temperature is lower than 10° C., the cooling and solidifying proceeds so fast that the greater part of the wall of hollow fiber forms a tightly packed layer and the porous hollow fiber suffers from deficiency in gas-exchange capacity. Conversely, if this temperature exceeds 90° C., the speed of crystallization of the polyolefin is so slow that the very thin through holes grow in diameter and the tightly packed layer grow very thin. This tightly packed layer is not formed at all when the temperature is higher. If the porous hollow fiber membrane of this quality is used in the oxygenator, it has the possibility of entailing either clogging or blood plasma leakage.

For the cooling and solidifying liquid to fulfil its purpose, it has only to refrain from dissolving the polyolefin and possess a relatively high boiling point. The substances which meet the description include alcohols such as methanol, ethanol, propanols, butanols, hexanols, octanols, and lauryl alcohol; liquid fatty acids such as oleic acid, palmitic acid, myristic acid, and stearic acid and alkyl ester thereof (such as ester of methyl, ethyl, isopropyl, or butyl) liquid hydrocarbons such as octane, nonane, decane, ketosene, gas oil, toluene, xylene, and methyl naphthalene; and halogenated hydrocarbons such as 1,1,2-trichloro-1,2,2,-trifluoroethane, trichlorofluoromethane, dichlorofluoromethane, and 1,1,2,2-tetrachloro-1,2,-difluoroethane, for example. Of course, these are not the only substances available for the purpose.

The cooling and solidifying liquid to be used in this invention brings about particularly desirable results when it exhibits no compatibility with the organic filler to be used and possesses a specific heat capacity in the range of 0.3 to 0.7 cal/g, preferably 0.3 to 0.6 cal/g. Typical examples of the cooling and solidifying liquid answering the description include silicone oils such as dimethyl silicone oil and methylphenyl silicone oil which have a dynamic viscosity in the range of 2 to 50 cSt, preferably 8 to 40 cSt, at 20° C. and polyethylene glycols which have an average molecular weight in the range of 100 to 400, preferably 180 to 330. The cooling and solidifying liquid is required to be incompatible with the organic filler to be used and to possess a specific heat capacity in the range of 0.3 to 0.7 cal/g for the following reason.

If the cooling and solidifying liquid happens to be a liquid capable of dissolving the organic filler, such as when a halogenated hydrocarbon is used as the cooling and solidifying liquid where liquid paraffin is selected as the organic filler, the organic filler is dissolved and extracted while the phase separation between the polypropylene and the organic filler is proceeding within the cooling and solidifying liquid, with the result that the organic filler is formed to pass from the inside to the outside of the hollow thread.

When the hollow thread in this state is completely cooled and solidified, the content of the organic filler in the hollow thread is low near the inner surface. After the organic filler is completely dissolved and extracted, the opening ratio is unduly low on the inner surface. Thus, the finally produced porous hollow fiber membrane is suspected to suffer from deficiency in gas-exchange capacity. In this particular case, the disadvantage may possibly ensue that even the low molecular component of the polypropylene is extracted from the hollow thread and accumulated on the inner wall of the cooling and solidifying liquid passing tube 19 to such an extent that the cooling and solidifying liquid passing tube 19 will have no sufficiently large inside diameter and the hollow thread will be disfigured.

If the cooling and solidifying liquid happens to be a compound identical or similar to the organic filler, such as when a liquid paraffin is used as the cooling and solidifying liquid where a liquid paraffin having a number average molecular weight similar to that of the liquid paraffin used as the cooling and solidifying liquid is used as the organic filler, since the organic filler (liquid paraffin) is not appreciably migrated in the hollow thread, the hollow thread acquires a pore density as prescribed and not unduly large specific heat and, therefore, accelerates the crystallization of polypropylene at a proper cooling speed and assumes a stable shape. During the course of the cooling, however, the organic filler or the cooling and solidifying liquid is locally distributed in the outermost surface of the hollow thread before the hollow thread is thoroughly cooled and solidified, with the result that the polypropylene content of the hollow thread is low in the outermost surface and the pores in the outer surface of the hollow thread are large and the solid phase has polypropylene particles dispersed in the form of a network so as to give rise to a surface abundant with sharp rises and falls.

If the cooling and solidifying liquid happens to be a liquid incompatible with and inactive to the organic filler and yet ample in specific heat capacity, such as when water, a substance having such a large specific heat capacity of about 1.0 cal/g, is used where a liquid paraffin is used as the organic filler, there arises the possibility that, owing to the high cooling effect to be brought about consequently, the polypropylene is quickly cooled and the outer surface is suffered to assume a state of particularly low crystallinity. The possibility ensues, therefore, that the propylene fails to form very small particles and the hollow thread gives rise to a hollow fiber membrane containing unduly small pores in the outer surface and consequently exhibiting a low gas-exchange capacity. Conversely, if the cooling and solidifying liquid happens to have a small specific heat capacity, the cooling effect is not enough for the hollow thread to be completed as a hollow yarn.

When a solution showing no compatibility with the organic filler and possessing a specific heat capacity in the range of 0.3 to 0.7 cal/g is used as the cooling and solidifying liquid, the otherwise possible localization of the distribution of the organic filler in the outer surface of the hollow thread is precluded, the cooling of the polypropylene is allowed to proceed at a proper speed, and the crystallization of the polypropylene is accelerated without adversely affecting the proper polypropylene distribution ratio in the outer surface. As a result, the outer surface of the produced hollow fiber membrane, similarly to the interior thereof, is formed of an aggregate of a multiplicity of polypropylene clusters produced by very small polypropylene particles being bound in the axial direction of fiber and is allowed to assume a smooth surface.

The hollow thread which has been cooled and solidified in the cooling and solidifying tank is forwarded via direction-changing bars to the extracting machine, for example, there to be deprived of the organic filler by dissolution and extraction. For the purpose of the dissolution and extraction of the organic filler, the showering method which comprises causing a liquid extractant to fall in shower onto the hollow thread on a belt conveyor as illustrated in FIG. 1 is not the only means available. The dissolution and extraction may be otherwise attained by a method which resorts to an extracting tank or a rewinding method which resorts to immersion in the liquid extractant of a skein onto which the hollow thread already taken up on a winding roll is rewound or some other method which is capable of establishing contact of the hollow thread with the liquid extractant. Optionally, two or more such methods may be used as suitably combined to ensure thoroughness of the contact.

For the liquid extractant to fulfil the purpose thereof, it has only to be incapable of dissolving the polypropylene forming the hollow fiber membrane and capable of dissolving and extracting the organic filler. Examples of the liquid extractant answering the description include alcohols such as methanol, ethanol, propanols, butanols pentanols, hexanols, octanols, and lauryl alcohol and halogenated hydrocarbons such as 1,1,2-trichloro-1,2,2,-trifluoroethane, trichlorofluoromethane, dichlorofluoromethane, and 1,1,2,2-tetrachloro-1,2,-difluoroethane. Among other liquid extractants mentioned above, hydrogenated hydrocarbons are particularly advantageous in terms of ability to effect the extraction of the organic filler and chlorofluorohydrocarbons are especially advantageous in terms of safety for the human body.

The porous hollow fiber membrane which is obtained as described above is subjected to a thermal crimping treatment. The thermal crimping treatment is aimed solely at imparting crimps to the porous hollow fiber membrane in the prescribed ratio previously mentioned. The method which comprises cross winding the porous hollow fiber membrane on a bobbin, for example, and thermally setting it as wound on the bobbin as illustrated in FIG. 1 is not the only means available for the thermal crimping treatment. Alternatively, this treatment may be effectively accomplished by a method which comprises heating the porous hollow fiber membrane and passing the hot membrane between a pair of grooved rollers which are mutually meshed after the pattern of cogwheels or a method which comprises heating the porous hollow fiber membrane, forcing the hot membrane as folded in a zigzag pattern into a funnel-shaped hole, and pushing it out of the hole, for example.

In the method for the production of the porous hollow fiber membrane, since the porous hollow fiber membrane is made of a thermoplastic resin, the crimps in the prescribed ratio can be imparted thereto by preparatorily heating the porous hollow fiber membrane in a crimped state and allowing it cool thereby setting it in the crimped state. If the thermal treatment performed for the impartation of such crimps to an undue extent, the excess heat disfigures the membrane texture. If this disfigurement lowers the void ratio of the porous hollow fiber membrane even by more than 50% from the original value existing before the impartation of crimps, the porous hollow fiber membrane is no longer capable of manifesting the effect thereof fully. If the thermal treatment is insufficient, the porous hollow fiber membrane which retains a desired crimped state during the module assembly is eventually deprived of crimps under the tension exerted by the residual stress. Again in this case, the porous hollow fiber member fails to manifest the effect fully. In the method which comprises cross winding the porous hollow fiber membrane on a bobbin and heat setting it as wound on the bobbin as illustrated in FIG. 1, therefore, the heat setting is desired to be carried out at a temperature in the range of 50° to 100° C., preferably 60° to 80° C., for a period in the range of 2 to 48 hours, preferably 6 to 36 hours.

The porous hollow fiber membrane obtained as described above is used optimally in the hollow fiber type oxygenator.

The hollow fiber membrane obtained by the conventional stretching method possess too high permeability to as to be efficiently in the oxygenator. When the blood is circulated inside the hollow fiber the ability to add oxygen to the blood is affected by the fact that the resistance offered by the membrane on the side bordering on the blood is unduly large and the resistance offered by the hollow fiber membrane lacks constancy and the ability to remove carbon dioxide gas from the blood depends on the magnitude of the resistance offered by the hollow fiber membrane which possesses unduly high permeability to gas. When the blood is circulated outside the hollow fiber, the ability to effect exchange of gases depends on the magnitude of the resistance offered by the hollow fiber membrane which again manifests unduly high permeability to gas.

The hollow fiber membrane of this invention itself possesses lower permeability to gas than the countertype obtained by the conventional stretching method. It fulfils the performance fully when it is used as incorporated in the oxygenator. Since it is produced by the extraction method, it cannot form pinholes susceptible of leakage of blood and, therefore, can be prevented from degradation of gas-exchange capacity.

Further, the hollow fiber membrane which is obtained by using, as the cooling and solidifying liquid, a liquid identical or similar to the organic filler has very small polypropylene particles connected after the pattern of a network so as to give rise to a surface abundant with very sharp rises and falls as previously mentioned. When this hollow fiber membrane is incorporated in the oxygenator, therefore, there arises the possibility that the adjacent hollow fibers coalesce fast to such an extent that the work of assembly is complicated and the adhesive agent is obstructed from amply enveloping the individual hollow fibers and giving rise to a desirable potting.

In the case of the hollow fiber membrane obtained by the method of the present invention, such drawbacks as involved in the assembly of the oxygenator cannot occur because the outer surface thereof, similarly to the interior thereof, is formed of an aggregate of a multiplicity of polypropylene clusters composed of polypropylene particles connected in the axial direction of fiber and, therefore, is allowed to acquire satisfactory surface quality inclusive of smoothness. No matter whether the blood may be passed on the outer surface or the inner surface of the hollow fiber membrane, this hollow fiber membrane inflicts no damage on the blood cell components and suffers from apparent pressure loss.

Further, since the hollow fiber membrane obtained by the method of this invention contains crimps at a prescribed ratio as previously mentioned, the gaps between the adjacent hollow fibers are relatively large and are varied within a limited range throughout the entire length of fiber. Even when the blood is circulated outside the hollow fiber membrane and the oxygen-containing gas is blown inside the hollow fiber membrane, the stagnation of the oxygen-containing gas such as air can hardly occur in these gaps. The hollow fiber membrane, therefore, ensures smooth flow of the blood and permits uniform contact between the blood and the oxygen-containing gas throughout the entire surface of the hollow fiber membrane and manifests a satisfactory gas-exchange capacity fully.

Figure 2:
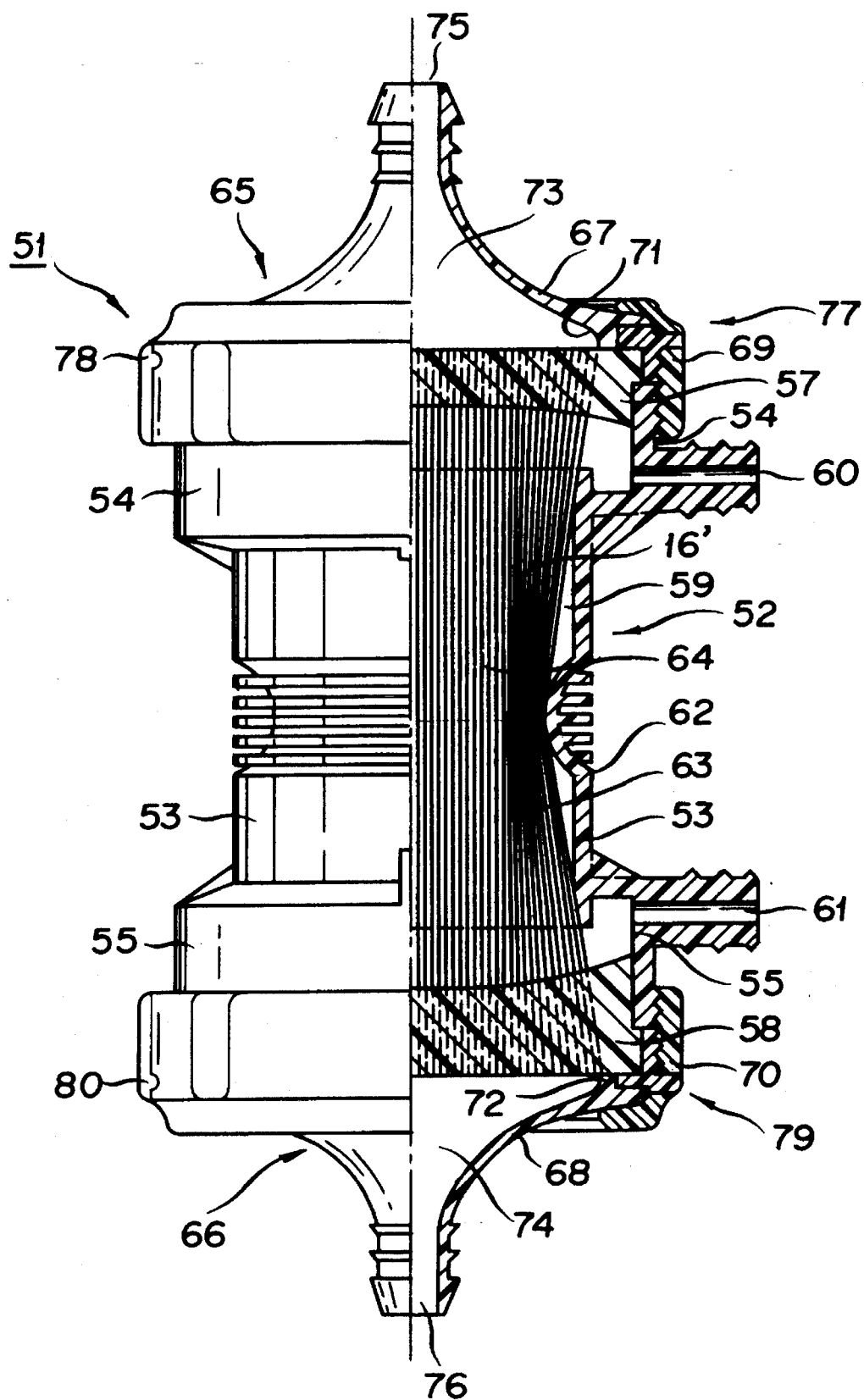
FIG. 2 is a half cross section illustrating a typical hollow-fiber membrane type oxygenator as one embodiment of the present invention.
Figure 3:
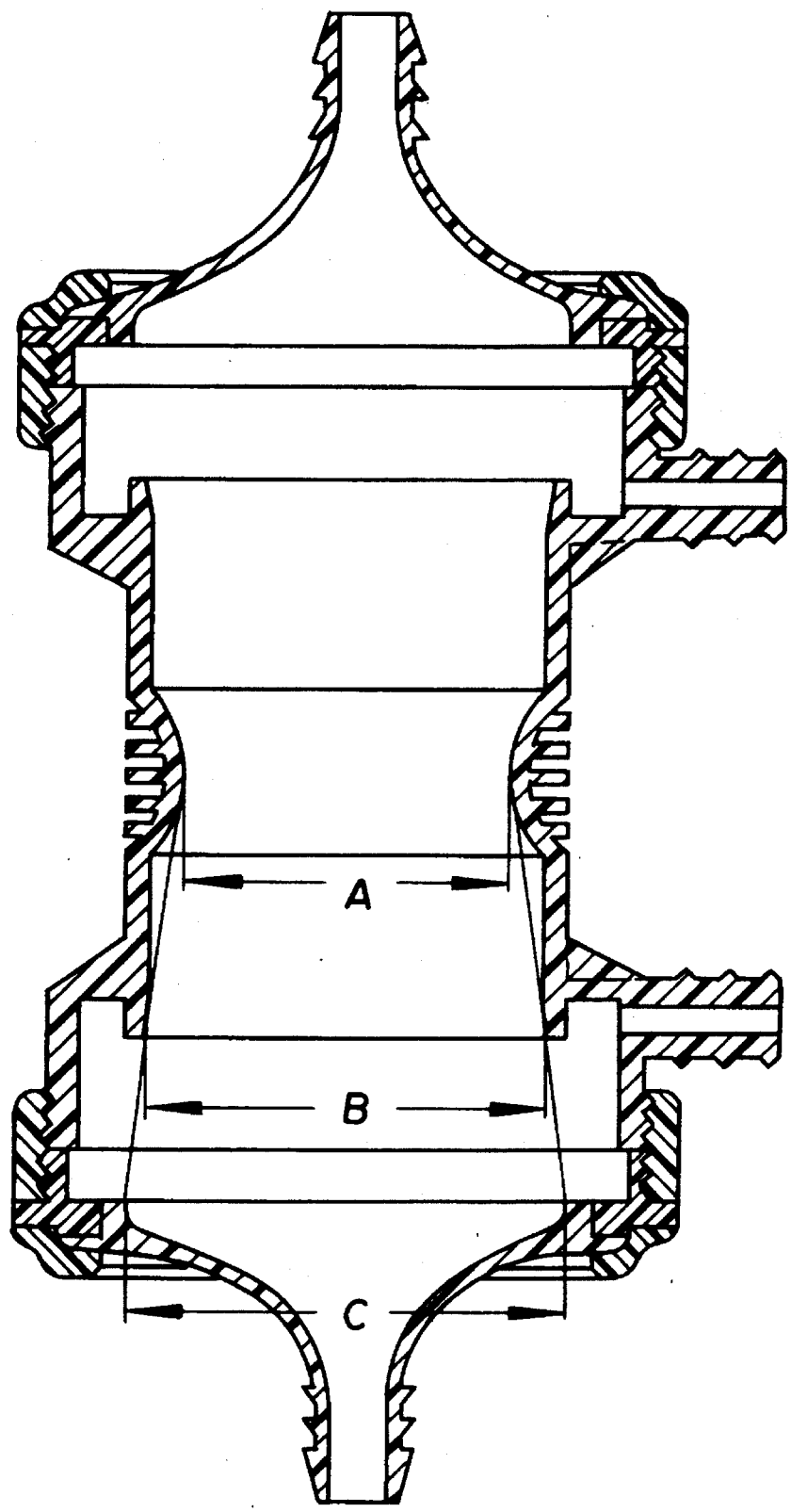
FIG. 3 is a cross section illustrating different portions of the embodiment of FIG. 2 relative to the packing ratio of hollow fiber membranes.

FIG. 2 illustrates a typical hollow fiber membrane type oxygenator as one embodiment (first embodiment) of this invention, specifically assembled for circulating blood inside the hollow fiber membrane and blowing the oxygen-containing gas outside the hollow fiber membrane. The hollow fiber membrane type oxygenator 51 is furnished with a housing 52. This housing 52 is provided at the opposite ends of a tubular main body 53 respectively with annular male-thread fitting covers 54, 55. Inside the housing 52, a multiplicity in the range of 10,000 to 60,000, for example, of porous hollow fiber membranes 16' crimped at a prescribed ratio previously mentioned are parallelly disposed in the longitudinal direction of the housing 52 as mutually separated. The opposite end parts of the porous hollow fiber membranes 16' are watertightly supported inside the fitting covers 54, 55 by diaphragms 57, 58 in such a manner that the openings thereof are not closed. The diaphragms 57, 58 define and enclose a gas compartment 59 jointly with the outer surfaces of the porous hollow fiber membranes 16' and the inner surface of the housing 52 and, at the same time, isolate the gas compartment 59 from the blood passing cavities (not shown) formed inside the porous hollow fiber membranes 16'. The fitting cover 54 is provided with an oxygen-containing gas inlet 60 for supply of an oxygen-containing gas and the other fitting cover 55 with an oxygen-containing gas outlet 16 for discharge of the oxygen-containing gas.

The tubular main body 53 of the housing 52 may be provided on the inner surface thereof at the center in the axial direction with an inwardly projected constringent part 62. The constringent part 62 disposed in the central part can be expected to improve the gas-exchange efficiency. This high gas-exchange efficiency can be obtained without requiring the provision of this constringent part 62, however, because the porous hollow fiber membranes 16' used in the oxygenator of the present invention are crimped at the prescribed ratio as already mentioned. The constringent part 62 is formed on the inner surface of the tubular main body 53 integrally with the tubular main body 53 and adapted to constrict the overall circumference of a hollow fiber bundle 63 composed of the multiplicity of porous hollow fiber membranes 16' inserted inside the tubular main body 53. Thus, the hollow fiber bundle 63 is constricted at the center in the axial direction thereof to give rise to a constricted part 64. The packing ratio of hollow fiber membranes, therefore, varies along the axial direction of the constricted part 64 and reaches the maximum at the center. The packing ratios at different parts are desired to be selected as follows. The packing ratio A in the constricted part 64 at the center is approximately in the range of 60 to 80%, the packing ratio B in the interior of the tubular main body 53 approximately in the range of 30 to 60%, and the packing ratio C at the opposite ends of the hollow fiber bundle 63, namely on the outer surfaces of the diaphragms 57, 58, approximately in the range of 20 to 40%.

Now, the formation of the diaphragms 57, 58 will be described below. As described above, the diaphragms 57, 58 fulfil an important function of isolating the inner cavities of the porous hollow fiber membranes 16' from the outside. Generally, the diaphragms 57 are produced by casting a macromolecular potting material of high polarity such as, for example, polyurethane, silicone, or epoxy resin on the opposite inner walls of the housing 52 by the centrifugal casting method and allowing the deposited layers of the potting material to set. To be more specific, a multiplicity of porous hollow fiber membranes 16' of a length greater than the length of the housing 52 are prepared and, with the opposite open ends thereof filled with a highly viscous resin, are arranged in place inside the tubular main body 53 of the housing 52. Then, with the opposite ends of the porous hollow fiber membranes 16' completely covered each with a pattern cover larger than the diameter of the fitting covers 54, 55, the housing 52 is rotated around the central axis of the housing 52 and, at the same time, the macromolecular potting material is cast from the opposite end sides. When the cast resin is set, the pattern covers are removed and the outer lateral parts of the set layers of resin are cut off with a sharp blade and the opposite open ends of the porous hollow fiber membranes 16' are exposed. As a result, the diaphragms 57, 58 are formed.

The outer surface of the diaphragms 57, 58 are respectively covered with flow path forming members 65, 66 each provided with an annular projection. These flow path forming members 65, 66 respectively comprise liquid distributing members 67, 68 and thread rings 69, 70. Near the circumferential edges of the liquid distributing members 67, 68 are respectively formed annular ridges 71, 72. By bringing the ends surfaces of the annular ridges 71, 72 into contact respectively with the diaphragms 57, 58 and helically fixing the screw rings 69, 70 respectively on the fitting covers 54, 55, blood inlet compartments 73, 74 are formed. These flow path forming members 65, 66 are provided respectively with a blood inlet 75 and a blood outlet 76. Two holes 77, 78 and 79, 80 are formed so as to communicate respectively with the empty spaces formed around the peripheral edges of the diaphragms 57, 58 by the diaphragms 57, 58 and the flow path forming members 65, 66. The flow path forming members 65, 66 are adapted to seal the housing in such a manner that access to the diaphragms 57, 58 is attained respectively through either of the two holes. The sealing may be otherwise attained through the medium of an O-ring (not shown).

Figure 4:
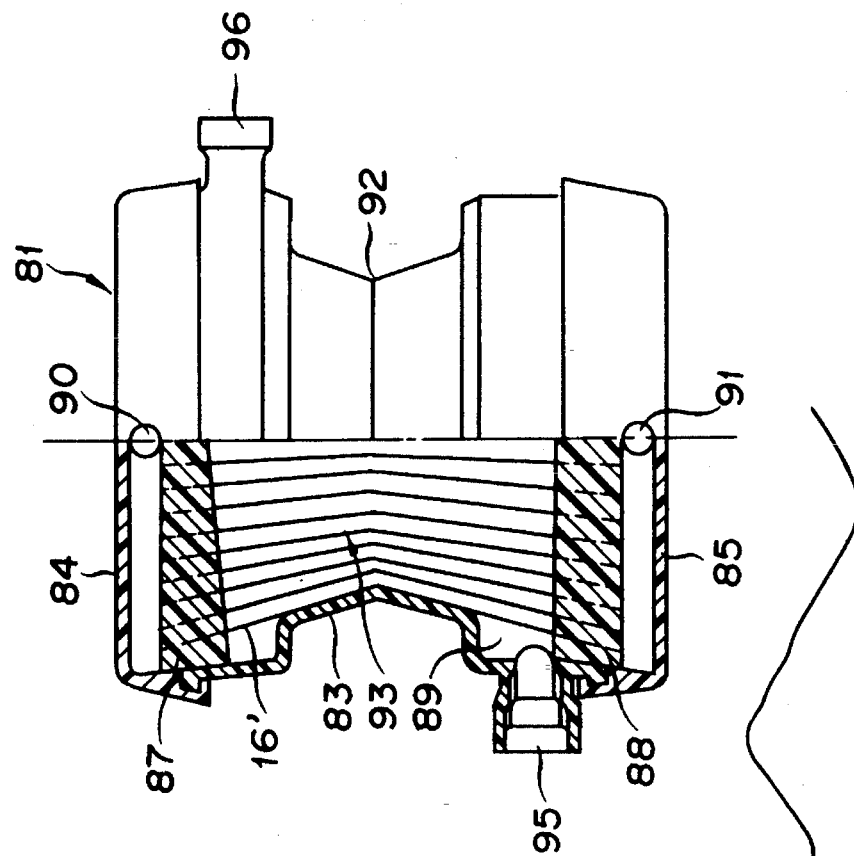
FIG. 4 is a half cross section illustrating another typical hollow-fiber membrane type oxygenator as another embodiment of this invention.
Figure 5:
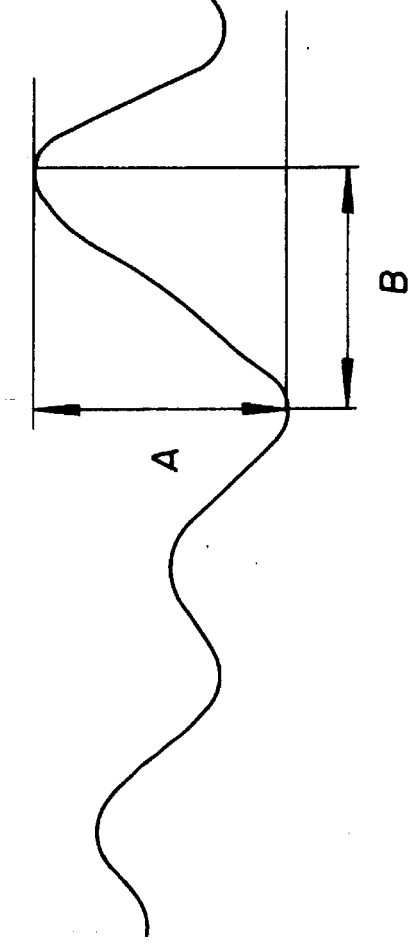
FIG. 5 is a diagram illustrating the position at which the maximum crimp amplitude/crimp half cycle period at maximum crimp amplitude ratio (A/B) is measured.

FIG. 4 illustrates another typical hollow fiber membrane type oxygenator as another embodiment (second embodiment) of this invention, specifically assembled so as to circulate blood outside the hollow fiber membrane and blow an oxygen-containing gas inside the hollow fiber. The hollow fiber membrane type oxygenator 81 is furnished with a housing 82. This housing 82 is provided at the opposite end parts of a tubular main body 83 thereof respectively with annular fitting covers 84, 85. Inside the housing 82, a multiplicity in the range of 10,000 to 70,000, for example, of porous hollow fiber membranes 16' possessing the properties mentioned previously are parallelly arranged in the longitudinal direction of the housing as mutually separated. The opposite end parts of the porous hollow fiber membranes 16' are watertightly supported in place respectively inside the fitting covers 84, 85 by diaphragms 87, 88 in such a manner that the openings thereof are not closed. The diaphragms 87, 88 form and enclose a blood compartment 89 jointly with the peripheral surface of the porous hollow fiber membranes 16' and the inner surface of the housing 82 and isolate oxygen-containing gas flowing cavities (not shown) formed inside the porous hollow fiber membranes 16' from the blood compartment 89. The housing 82 is provided in one part thereof with a blood inlet 95 for supply of blood and in the other part thereof with a blood outlet 96 for discharge of blood.

The tubular main body 83 of the housing 82 may be provided on the inner surface thereof at the center in the axial direction with a projecting constringent part 92. The constringent part 92 integrally with the tubular main body 83 and adapted to constrict the overall periphery of a hollow fiber bundle 93 composed of a multiplicity of porous hollow fiber membranes 16' inserted in the interior of the tubular main body 83. Thus, the hollow fiber bundle 93 is constricted at the center in the axial direction thereof to form a constricted part 94. The packing ratio of hollow fiber membranes, therefore, varies in the axial direction of fiber and reaches the maximum at the center. In the fitting covers 84, 85, an oxygen-containing gas inlet 90 and an oxygen-containing gas outlet 91 are respectively formed. The other components and the method for the formation thereof are equivalent, with due modifications, to those of the hollow fiber membrane type oxygenator of the first embodiment. Thus, the description thereof will be omitted.

Now, the present invention will be described more specifically, below with reference to working examples.

Examples 1 to 3

A porous hollow fiber membrane of polypropylene formed by being stretched in the axial direction by the stretching method, having an inside diameter of 200 μm and a wall thickness of 24 μm and containing very small pores having an average radius of 700Å was cross wound on a bobbin 95 mm in diameter and then crimped by heat treating at 60° C. for 18 hours. The porous hollow fiber membrane obtained consequently had an average crimp amplitude of 70% of the outside diameter of the hollow fiber membrane, a maximum crimp amplitude/crimp half cycle period at maximum crimp amplitude ratio of 0.03, and a crimp ratio of 2.5%. From this crimped porous hollow fiber membrane, an oxygenator of the first embodiment, an oxygenator of the second embodiment, and an oxygenator conforming to the first embodiment, except that the hollow fiber bundle was not constricted at the center in the axial direction, (third embodiment) were produced as respective module in the manner described below. They were tested for oxygen gas flux, ability to add oxygen gas, and ability to remove carbon dioxide gas. The results are shown in Table 3.

Controls 1 and 2

For comparison, the same oxygenator modules as those of Example 1 were produced by using without any modification a porous hollow fiber membrane of polypropylene formed by being stretched in the axial direction by the stretching method, having an inside diameter of 200 μm and a wall thickness of 24 μm, and containing very small pores having an average radius of 700Å; the module of the first embodiment for Control 1 and that of the second embodiment for Control 2 respectively. These oxygenator modules were tested for oxygen gas flux, ability to add oxygen gas, and ability to remove carbon dioxide gas. The results are shown in Table 3.

The definitions of various terms used in the specification and the methods for determination thereof are shown below.

Inside diameter and wall thickness

The properties were determined by randomly drawing 10 of the hollow fiber membranes of a given oxygenator cutting them into tubes about 0.5 in length with a sharp razor blade, projecting the sections of the tubes on a screen with a universal projector (Nikon Profile Projector V-12), measuring the outside diameters $d_1$ and inside diameters $d_2$ of the projected sections with a counter (Nikon Digital counter CM-6S), and calculating the wall thickness t by the formula $t=d_1-d_2$. The respective averages each of 10 measured values were reported.

Void ratio (%)

This property was determined by taking about 2 g of the hollow fiber membranes of a given oxygenator, cutting them into tubes not more than 5 mm in length with a sharp razor, pressing the resultant test specimen to a pressure of 1,000 kg/cm$^2$ with a mercury porosimeter (Carlo Erba Corp; Motem 65A), finding the total volume of pores (volume of pores in the hollow fiber per unit weight), and calculating the void ratio.

Average crimp amplitude and maximum crimp amplitude/crimp half cycle period at maximum crimp amplitude ratio A given hollow fiber membrane was tested for crimped condition by the measurement of rises and falls on the membranes surface over a length of 35 mm with a universal surface shape tester (produced by Kosaka Kenkyusho K. K. and marketed under product code of "SE-3S") to determined the largest (A) of amplitudes found in round of measurement and the ratio (A/B) of this maximum amplitude (A) to the distance (B) between the maximum point and the minimum point in the amplitude. Ten rounds of the measurement were made per lot and the average of the ten found values was reported as the maximum crimp amplitude/crimp half cycle period at maximum crimp amplitude ratio. The average of ten largest of the amplitudes found in one round of measurement was reported as the average crimp amplitude.

Crimp ratio

This property was determined by subjecting a given hollow fiber membrane in an initial length of 25 mm to a tensile test with a tensile tester (produced by Toyo Seiki K. K. and marketed under trademark designation of "Strograph T") thereby finding the lengths of the sample acquired under two loads, 1 mg and 50 mg per denier, and dividing the difference of the two distances by the initial length. The results quotient in percentage was reported as the magnitude of this property.

Oxygen gas flux

This property was determined by preparing a miniature module 14 cm in available length and 0.025 m$^2$ in available membrane area with a given porous hollow fiber membrane, closing one end of the miniature module, exerting one atmosphere of pressure on the interior of the hollow membrane with oxygen until a steady state was obtained, and measuring the flow volume of oxygen gas with a flow meter (produced by Kusano Rikagakukiki Seisakusho and marketed under trademark designation of "Flotomer"). The scale reading was reported as the magnitude of this property.

Ability to add oxygen gas and ability to removel carbon dioxide gas (First embodiment)

These properties were determined by preparing an oxygenator module 130 mm in available length and 5.4 m$^2$ in available membrane area using a given hollow fiber membrane, passing bovine blood (standard venous blood) in a single path inside the hollow fiber membrane at a flow volume of 6.0 lit/min., passing purified oxygen outside the hollow fiber membrane at a flow volume of 6.0 lit/min. measuring the pH, partial pressure of carbon dioxide gas ($PCO_2$), and partial pressure of oxygen gas ($PO_2$) of the bovine blood samples taken at the inlet and outlet of the oxygenator with a blood gas measuring device (produced by Radiometer Corp. and marketed under product code of "BGA 3" and calculating the differences of partial pressure at the inlet and outlet of the oxygenator. The detailed specification of the oxygenator, module is shown in Table 1. The quality of the standard venous blood is shown in Table 2.

(Second embodiment)

The properties were determined by preparing an oxygenator module 90 mm in available length and 2.1 m$^2$ in available membrane area using a given hollow fiber membrane, passing bovine blood (standard venous blood) in a single path outside the hollow fiber membrane at a flow volume of 6.0 lit/min., passing purified oxygen inside the hollow fiber membrane at a flow rate of 6.0 lit/min, measuring the pH value, partial pressure of oxygen inside the hollow fiber membrane at a flow rate of 6.0 min, measuring the pH value, partial pressure of carbon dioxide gas ($PCO_2$), and partial pressure of oxygen gas ($PO_2$) of the bovine blood samples taken at the inlet and outlet of the oxygenator with a blood gas measuring device ( produced by Radiometer Corp. and marketed under product code of "BGA3"), and calculating the difference of partial pressures at the inlet and outlet of the oxygenator. The detailed specification of the oxygenator module is shown in Table 1.

(Third embodiment)

The properties were determined by preparing an oxygenator identical to the oxygenator of the first embodiment, except that the hollow fiber bundle was not constricted at the center in the axial direction, and carrying out the same measurements as in the first embodiment.

TABLE I

|  | First embodiment | Second embodiment | Third embodiment | Control 1 embodiment | Control 2 embodiment |
|---|---|---|---|---|---|
| Membrane area (m$^2$) | 5.4 | 2.1 | 5.0 | 5.4 | 2.1 |
| Number of membranes | 62,000 | 32,800 | 57,400 | 62,000 | 32,800 |
| Available length/total length (cm) | 14/17 | 9/13.5 | 14/17 | 14/17 | 9/13.5 |
| Packing ratio (%) |  |  |  |  |  |
| A part | 60 | 56 | 50 | 60 | 56 |
| B part | 50 | 42 | 50 | 50 | 42 |
| C part | 43 | 30 | 40 | 43 | 30 |

TABLE 2

| Blood | Fresh heparin-added bovine blood |
|---|---|
| Hematocrit value | 35% (prepared from physiological saline solution) |
| Hemoglobin concentration | 12 ± 1 g/dl |
| Excess base | 0 ± 2 mEq/liter (prepared from sodium bicarbonate) |
| Saturation degree of oxygen | 65 ± 5% |
| Partial pressure of carbon dioxide gas | 45 ± 5 mg |
| Temperature | 37 ± 2° C. |

TABLE 3

|  | First embodiment | Second embodiment | Third embodiment | Control 1 embodiment | Control 2 embodiment |
|---|---|---|---|---|---|
| Oxygen gas flux (lit./min.m$^2$·atm) | 1,200 | 1,200 | 1,200 | 1,200 | 1,200 |
| Ability to add oxygen gas | 262 | 272 | 273 | 256 | 157 |
| Ability to remove carbon dioxide gas (ml/min) | 251 | 263 | 269 | 235 | 164 |

Example 4

By use of a twin-screw extruder (produced by Ikegai Iron Works, Ltd. and marketed under produce code of "PCM-30-25"), 100 parts by weight of a propylene homopolymer having a melt index (M.I.) of 23, 130 parts by weight of a liquid paraffin (number average molecular weight 324), and 0.5 part by weight of 1,3,2,4-bis(ethylbenzene)sorbitol as a crystal seed forming agent were melted and kneaded and extruded and then pelletized. By use of a device illustrated in FIG. 2, namely a single-screw extruder (produced by Kasamatsu Seisakusho and marketed under product code of "WO-30"), the pellets were melted at 180° C. and discharged into the ambient air at a rate of 3.6 to 5.0 g/min through an annular spinning nozzle 4 mm in core diameter, 6 mm in inside diameter, 7 mm in outside diameter, and 15 mm in land length to let fall a hollow thread 16. The distance of this fall was 20 to 30 mm. Then, the hollow thread 16 was brought into contact with Freon 113 (1,1,2-trichloro-1,2,2,-trifluoroethylene) held as a cooling and solidifying liquid 17 in a cooling tank 18, and then cooled by being brought into parallel contact with a cooling and solidifying liquid 17 spontaneously falling down the interior of a cooling and solidifying liquid passing tube 19. In this case, the temperature of the cooling and solidifying liquid 17 was 20° C. Then, the hollow thread 16 was introduced into the cooling and solidifying liquid 17 held in a solidifying tank 20, caused to change the direction of its travel by a direction changing bar 21, led to a drive roll 22a operated at a winding speed of 80 m/min and, immediately in a shower conveyor type extruder 27, showered with a liquid extractant 25 using Freon 113 for thorough extraction of the aforementioned liquid paraffin. The hollow fiber membrane 16' which had been vested with porosity as described above was taken out of the extruder 27 by means of drive rolls 22b, forwarded via drive rolls 22c to a winder 28, and taken up by cross winding on a bobbin 29 having a diameter of 95 mm by means of the winder 28. The hollow fiber membrane 16' thus taken up in cross winding on the bobbin 29 was crimped by being heat treated in an oven at 60° C. for 18 hours.

The porous hollow fiber membrane consequently obtained was found to possess an average crimp amplitude of 72% of the outside diameter, a maximum crimp amplitude/crimp half cycle period at maximum crimp amplitude ratio of 0.03, and a crimp ratio of 1.7%. From the crimped porous hollow fiber membrane, an oxygenator of the first embodiment, an oxygenator of the second embodiment, and an oxygenator module (third embodiment) identical to that of the first embodiment, except that the hollow fiber bundle was not constricted at the center in the axial direction, were prepared. The oxygenator modules were tested for oxygen gas flux, ability to add oxygen gas, ability to remove carbon dioxide gas, and blood plasma leakage. The results are shown in Table 5. Table 4 shows the conditions for the embodiments mentioned above.

Control 3

A porous hollow fiber membrane was prepared by following the procedure of Example 4, except that the crimping treatment was omitted. From this porous hollow fiber membrane, modules of an oxygenator of the first embodiment and an oxygenator of the second embodiment were prepared. These modules were tested for oxygen gas flux, ability to add oxygen gas, ability to remove carbon dioxide gas, and blood plasma leakage. The results are shown in Table 5.

Control 4

A porous hollow fiber membrane of polypropylene formed by being stretched in the axial direction by the stretching method, having an inside diameter of 200 μm and a wall thickness of 25 μm and containing very small pores 700Å in average radius was taken up in cross winding on a bobbin 95 mm in diameter and crimped by being heat treated in an oven at 60° C. for 18 hours. The porous hollow fiber membrane thus obtained was found to have an average crimp amplitude of 70% of the outside diameter of hollow fiber membrane, a maximum crimp amplitude/crimp half cycle period at maximum crimp amplitude ratio of 0.03, and a crimp ratio of 2.5%. From this porous hollow fiber membrane, an oxygenator of the first embodiment, an oxygenator of the second embodiment, and an oxygenator of the third embodiment were produced. These oxygenator modules were tested for oxygen gas flux, ability to add oxygen gas, ability to remove carbon dioxide gas, and blood plasma leakage. The results are shown in Table 5.

at the center in the axial direction. These oxygenator modules were tested for ability to add oxygen gas, ability to remove carbon dioxide gas, and blood plasma leakage. The results are shown in Table 6.

The data of Controls 3 and 4 are also shown in the table.

TABLE 4

|  | Example 4 | | | Control 3 | | | Control 4 | | |
| --- | --- | --- | --- | --- | --- | --- | --- | --- | --- |
|  | First embodiment | Second embodiment | Third embodiment | First embodiment | Second embodiment | First embodiment | Second embodiment | Third embodiment |
| Membrane area ($m^2$) | 5.4 | 2.1 | 5.0 | 5.4 | 2.1 | 5.4 | 2.1 | 5.0 |
| Number of membranes | 62000 | 32800 | 57400 | 62000 | 32800 | 62000 | 32800 | 57400 |
| Available length/total length (cm) | 14/17 | 9/13.5 | 14/17 | 14/17 | 9/13.5 | 14/17 | 9/13.5 | 14/17 |
| Packing ratio (%) | | | | | | | | |
| A part | 66 | 56 | 54 | 66 | 56 | 60 | 56 | 50 |
| B part | 54 | 42 | 54 | 54 | 42 | 50 | 42 | 50 |
| C part | 53 | 30 | 50 | 53 | 30 | 43 | 30 | 40 |

TABLE 5

|  | Example 4 | | | Control 3 | | | Control 4 | | |
| --- | --- | --- | --- | --- | --- | --- | --- | --- | --- |
| Shape (inside diameter/wall thickness) (μm) | 200/50 | | | 200/50 | | | 200/50 | | |
| Void ratio (%) | 37 | | | 38 | | | 50 | | |
| Oxygen gas flux (lit/min. $m^2$ · atm) | 480 | | | 495 | | | 1200 | | |
|  | First embodiment | Second embodiment | Third embodiment | First embodiment | Second embodiment | First embodiment | Second embodiment | Third embodiment |
| Ability to add oxygen gas (ml/min) | 255 | 270 | 310 | 260 | 130 | 262 | 272 | 273 |
| Ability to remove carbon dioxide gas (ml/min) | 250 | 260 | 296 | 215 | 170 | 251 | 263 | 269 |
| Leakage of blood plasma | No leakage after 30 hrs. | — | — | No leakage after 30 hrs. | — | Leakage after 17 hrs. | — | — |

Example 5

A porous hollow fiber membrane was obtained by following the procedure of Example 4, except that polyethylene glycol (Mn=200) was used in place of Freon 113 (1,1,2-trichloro-1,2,2-trifluoroethylene) as the cooling and solidifying liquid.

This porous hollow fiber membrane was found to have an average crimp amplitude of 72% of the outside diameter of the hollow fiber membrane, a maximum crimp amplitude/crimp half cycle period at maximum crimp amplitude ratio of 0.03, and a crimp ratio of 1.7%. The crimped porous hollow fiber membrane was tested for shape (inside diameter/wall thickness), void ratio, gas flux, and birefringence ratio as an index of crystal orientation. The results are shown in Table 6. From this crimped porous hollow fiber membrane, an oxygenator of the first embodiment, an oxygenator of the second embodiment, and an oxygenator module (third embodiment) identical to the oxygenator of the first embodiment, except that the hollow fiber bundle was not constricted Throughout the whole text of this specification, the numerical values of the blood plasma leakage and the birefringence ratio are those determined by the following method.

Blood Plasma Leakage

This property was determined by preparing the same oxygenator module as used in the test for the ability to add oxygen gas and the ability to remove carbon dioxide gas, incorporating this oxygenator module in a partial V-A bypass circuit for the jugular vein-carotid artery cannulation using a mongrel (about 20 kg in weight), continuing extracorporeal circulation for 30 hours, and measuring the amount of blood plasma leaking from the interior of the hollow fiber. Where no visible leakage was detected, the condensed drop of steam outside the hollow fiber was assayed for proteinaceous reaction in an effort to detect even a trace of blood plasma leakage.

Birefringence ratio (Δn) (retardation method)

From a batch of hollow fiber membranes, 10 membranes were randomly taken. From the central parts of these samples, portions 3 cm in length were cut off. By inserting oblique cuts at one end of these portions, test pieces were obtained.

These test pieces were placed on a slide glass, impregnated with a soaking liquid (liquid paraffin), and mounted on a rotary stage of a polarizing microscope. With the aid of a monochromic light source or a filter and with the compensator removed, the test pieces were rotated on the stage under cross Nicol prism and then fixed at the position at which the vision was brightest (the position reached by 45° rotation from the darkest position). Then, the compensator was replaced and the analyzer was rotated to find the angle (θ) of rotation required in reaching the darkest position. The retardation (R) was calculated from the following formula and the birefringence ratio of the hollow fiber membrane was calculated from the following formula. The average of the value of 10 measurements was reported as the magnitude of birefringence factor.

$$\text{Retardation, } R = \frac{180 - \theta}{180} \cdot \lambda$$

wherein λ is the wavelength used in the test.

$$\text{Birefringence ratio, } \Delta n = \frac{R}{d}$$

wherein d is the thickness of test piece (corrected with respect to the void ratio).

Conditions for measurement:
Polarizing microscope Nikon OPTIPHOTO-POL
Wavelength of light source 546 nm
Compensator Compensator of Senarmont type Incidentally, a perfectly oriented polypropylene exhibits a birefringence ratio, Δn, of 0.035 (reported in literature).

Examples 6 to 8

Similar tests as in Example 4 were conducted by use of hollow fiber membranes obtained by repeating the procedure of Example 4 except that maximum crimp amplitude/crimp half cycle ratios and crimp amplitudes of the outside diameter were varied as shown in Table 7. The results are shown in Table 7.

Examples 9 to 11

Similar tests as in Example 5 were conducted by use of hollow fiber membranes obtained by repeating the procedure of Example 5 except that maximum crimp amplitude/crimp half cycle ratios and crimp amplitudes of the outside diameter were varied as shown in Table 8. The results are shown in Table 8.

TABLE 6

|  | Example 5 | | | Control 3 | | | Control 4 | | |
| --- | --- | --- | --- | --- | --- | --- | --- | --- | --- |
| Shape (inside diameter/ wall thickness) (μm) | 200/50 | | | 200/50 | | | 200/24 | | |
| Void ratio (%) | 42 | | | 38 | | | 50 | | |
| Oxygen gas flux (lit/min. m² · atm) | 820 | | | 495 | | | 1200 | | |
| Briefringence ratio (Δn) | 0.003 | | | 0.003 | | | 0.014 | | |
|  | First embodiment | Second embodiment | Third embodiment | First embodiment | Second embodiment | First embodiment | Second embodiment | Third embodiment |
| Ability to add oxygen gas (ml/min) | 255 | 274 | 305 | 260 | 130 | 262 | 272 | 273 |
| Ability to remove carbon dioxide gas (ml/min) | 250 | 266 | 300 | 215 | 170 | 251 | 263 | 269 |
| Leakage of blood plasma | No leakage after 30 hrs. | — | — | No lekage after 30 hrs. | — | Leakage after 17 hrs. | — | — |

TABLE 7

| | Example 6 | | | Example 7 | | | Example 8 | | |
|---|---|---|---|---|---|---|---|---|---|
| Shape (inside diameter/ wall thickness) (μm) | 200/50 | | | 200/50 | | | 200/50 | | |
| Void ratio (%) | 38 | | | 37 | | | 37 | | |
| Oxygen gas flux (lit/ min. m² · atm) | 485 | | | 485 | | | 470 | | |
| Maximum crimp amplitude/crimp half cycle ratio | 0.01 | | | 0.05 | | | 0.08 | | |
| Crimp ratio (%) | 1.3 | | | 1.9 | | | 2.5 | | |
| Briefringence ratio (Δn) | 0.003 | | | 0.003 | | | 0.003 | | |
| | First embodiment | Second embodiment | Third embodiment | First embodiment | Second embodiment | Third embodiment | First embodiment | Second embodiment | Third embodiment |
| Ability to add oxygen gas (ml/min) | 260 | 240 | 265 | 255 | 290 | 270 | 250 | 280 | 260 |
| Ability to remove carbon dioxide gas (ml/min) | 245 | 250 | 255 | 250 | 260 | 285 | 260 | 260 | 280 |
| Leakage of blood plasma | No leakage after 30 hrs. | — | — | No leakage after 30 hrs. | — | — | No leakage after 30 hrs. | — | — |

TABLE 8

| | Example 9 | | | Example 10 | | | Example 11 | | |
|---|---|---|---|---|---|---|---|---|---|
| Shape (inside diameter/ wall thickness) (μm) | 200/50 | | | 200/50 | | | 200/50 | | |
| Void ratio (%) | 43 | | | 42 | | | 40 | | |
| Oxygen gas flux (lit/ min. m² · atm) | 830 | | | 820 | | | 790 | | |
| Maximum crimp amplitude/crimp half cycle ratio | 0.01 | | | 0.05 | | | 0.08 | | |
| Crimp ratio (%) | 1.3 | | | 1.9 | | | 2.5 | | |
| Briefringence ratio (Δn) | 0.003 | | | 0.003 | | | 0.003 | | |
| | First embodiment | Second embodiment | Third embodiment | First embodiment | Second embodiment | Third embodiment | First embodiment | Second embodiment | Third embodiment |
| Ability to add oxygen gas (ml/min) | 275 | 255 | 280 | 260 | 260 | 310 | 240 | 280 | 305 |
| Ability to remove carbon dioxide gas (ml/min) | 290 | 260 | 285 | 250 | 270 | 300 | 255 | 265 | 290 |
| Leakage of blood plasma | No leakage after 30 hrs. | — | — | No leakage after 30 hrs. | — | — | No leakage after 30 hrs. | — | — |

As described above, this invention is directed to a porous hollow fiber membrane of polyolefin having an inside diameter in the range of 150 to 300 μm and a wall thickness in the range of 10 to 150 μm and a wall thickness in the range of 10 to 150 μm and a substantially circular cross section, which porous hollow-fiber membrane is characterized by the fact that the inner surface side thereof has very small particles of the polyolefin closely bound to form a tightly packed layer, the inner surface side thereof has very small particles of the polyolefin bound after the pattern of chains to form a porous layer, very thin through holes are formed as extended from the inner surface side to the outer surface side, and the hollow fiber membrane has an average crimp amplitude in the range of 35 to 120% of the outside diameter, a maximum crimp amplitude/crip half cycle period at maximum crimp amplitude ratio in the range of 0.01 to 0.1, and a crimp ratio in the range of 1.0 to 3.0%.

When an oxygenator is produced by using the porous hollow fiber membrane and this oxygenator is operated for extracorporeal circulation by circulating blood outside the hollow fiber membrane and blowing an oxygen-gas containing gas inside the hollow fiber membrane, since the crimps give rise to relatively large gaps between the adjacent hollow fibers and the gaps are varied within a prescribed range throughout the entire length of hollow fiber, the oxygen-containing gas such as air is hardly suffered to stagnate in the gaps. As a result, the oxygenator enjoys a high gas-exchange capacity because the blood is passed smoothly and the blood and the oxygen-containing gas are brought into uniform mutual contact throughout the entire surface of the hollow fiber membrane. The oxygenator cannot entail the problem of blood plasma leakage, for example, on account of the texture of membrane. The effects of the porous hollow fiber membrane of this invention described above are manifested μmore advantageously when the porous hollow fiber membrane has a void ratio in the range of 5 to 60% and a gas flux in the range of 100 to 1,500 liters/min.m². atm., the polyolefin is polypropylene, and the porous hollow fiber membrane has an average crimp amplitude in the range of 50 to 100% of the outside diameter, a maximum crimp amplitude/ crimp half cycle period at maximum crimp amplitude ratio in the range of 0.02 to 0.05, and a crimp ratio in the range of 2.0 to 3.0%. Thus, this porous hollow fiber membrane is used more advantageous for the oxygenator.

During the course of assembly an oxygenator using the porous hollow fiber membrane, since this porous hollow fiber membrane has satisfactory surface quality inclusive of smoothness, such drawbacks as coalescence of adjacent hollow fiber membranes and defective potting due to adhesive agent are not entailed. When the oxygenator using the porous hollow fiber membrane of such highly desirable quality is used for extracorporeal blood circulation by circuiting the blood outside the hollow fiber membrane in the oxygenator and blowing the oxygen-containing gas inside the hollow fiber membrane, since the crimps give rise to relatively large gaps between the adjacent hollow fibers and the gaps are varied within a prescribed range throughout the entire length of hollow fiber as described above, the oxygen-containing gas such as air is hardly suffered to stagnate in the gaps. As a result, the oxygenator enjoys a high gas-exchange capacity because the blood is passed smoothly and the blood and the oxygen-containing gas are brought into uniform mutual contact throughout the entire surface of the hollow fiber membrane. These features are manifested more advantageously when the birefringence ratio of the porous hollow fiber membrane in the axial direction of fiber is in the range of 0.001 to 0.01.

This invention is also directed to a method for the production of a porous hollow fiber membrane, which is characterized by mixing a polyolefin, an organic filler uniformly dispersible in the polyolefin in the molten state thereof and easily soluble in a liquid extractant to be used, and a crystal seed forming agent, melting the resultant mixture and discharging the molten mixture through annular spinning nozzles into hollow threads, allowing the hollow threads to contact a cooling and solidifying liquid incapable of dissolving the polyolefin thereby cooling and solidifying the hollow threads, then bringing the resultant cooled and solidified hollow threads into contact with the liquid extractant incapable of dissolving the polyolefin thereby extracting the organic filler from the hollow threads, and thermally crimping the hollow threads thereby forming porous follow fiber membranes possessing an average crimp amplitude in the range of 35 to 120% of the outside diameter, a maximum crimp amplitude/crimp half cycle period at maximum crimp amplitude ratio in the range of 0.01 to 0.1, and a crimp ratio in the range of 1.0 to 3.0%.

By this method can be produced a porous hollow fiber membrane which possesses such outstanding properties as mentioned above, including an enhanced gas-liquid contact efficiency in the gas exchange and sacrificing none of the desirable microporous texture and gas-exchange efficiency of the porous hollow fiber membrane produced by the extraction method. In the method of the present invention for the production of a porous hollow fiber membrane, the produced porous hollow fiber possessing a shape abundant with gas-liquid contact efficiency, a texture notably excellent in other properties, and a stable behavior when the impartation of crimps is effected by cross winding the hollow fiber membrane on a bobbin and heat setting it as wound on the bobbin and this heat setting is carried out at a temperature in the range of 50° to 100° C. for a period in the range of 2 to 48 hours. Further, the produced hollow fiber membrane enjoys a still better quality when the polyolefin is polypropylene, the organic filler is a hydrocarbon having a boiling point exceeding the melting point of the polyolefin, the hydrocarbon is a liquid paraffin or an α-olefin oligomer, the amount of the organic filler to be incorporated is in the range of 35 to 170 parts by weight, based on 100 parts by weight of the polyolefin, the crystal seed forming agent is an organic heat-resistant substance having a melting point exceeding 150° C. and a gelling point exceeding the crystallization initiating point of the polyolefin to be used, and the amount of the crystal led forming substance to be incorporated is in the range of 0.1 to 5 parts by weight, based on 100 parts by weight of the polyolefin.

This invention is further directed to an oxygenator provided with a hollow fiber membrane as a gas-exchange membrane, which oxygenator is characterized by the fact that the gas-exchange membrane is a porous hollow fiber membrane of a polyolefin having an inside diameter in the range of 150 to 300 and a wall thickness in the range of 10 to 150 μm and a substantially circular cross section, the inner surface side thereof has very small particles of the polyolefin closely bound to form a tightly packed layer, the outer surface side thereof has very small particles of the polyolefin interconnected after the pattern of chains to form a porous layer, very thin through holes are formed as extended from the inner surface side to the outer surface side, and the porous hollow fiber membrane has an average crimp amplitude in the range of 35 to 120% of the outside diameter, a maximum crimp amplitude/crimp half cycle period at maximum crimp amplitude ratio in the range of 1.0% to 3.0%. This oxygenator, therefore, does not suffer from such drawbacks as blood plasma leakage. When this oxygenator is used for extracorporeal circulation of blood by circulating the blood outside the hollow fiber membrane and an oxygen-containing gas inside the hollow fiber membrane, the possibility of the oxygen-containing gas stagnating in the gaps intervening between the adjacent hollow fibers is nil and the gas-exchange is carried out efficiently. When the oxygenator is used for extracorporeal blood circulating by circulating the blood inside the hollow fiber membrane and blowing the oxygen-containing gas outside the hollow fiber membrane, it is capable of carrying out the gas exchange with high efficiency. In this case, the highly efficient gas exchange can be obtained without requiring the hollow fiber bundle to be constricted at the center in the axial direction. In the oxygenator of the lung intended for passing the blood inside the hollow fiber membrane, since the steam contained in the oxygen-containing gas inside the oxygenator is condensed to form dew on the inner surface of the housing of the oxygenator, there arises the possibility of water drops wetting the surface of the hollow fiber and the wetted hollow fiber adhering fast to the inner surface of the housing. Thus, gaps of prescribed dimensional properties interposed between the hollow fiber bundle and the inner surface of the housing so as to keep the hollow fiber bundle from adhering fast to the inner surface of the housing. If a continuous gap is formed throughout the entire length of the hollow fiber bundle, the passage of gas occurs exclusively in the continuous gap. Thus the oxygenator is provided at the center in the axial direction with a constricted part which is intended to render the phenomenon of channeling difficult to occur. When the crimped hollow fiber membrane contemplated by the present invention is used, since the hollow fiber membrane itself is crimped, the dew possibly formed on the inner surface of the housing cannot cause tight adhesion of the hollow fiber membrane to the inner surface of the housing even if no large space is interpose( between the hollow fiber membrane and the inner surface of the housing. Thus, the oxygenator is allowed to retain the gas-exchange efficiency intact even in the absence of the constricted part. The oxygenator of this invention is enabled to manifest the quality more advantageously and even permit a reduction in size when the hollow fiber membrane has a void ratio in the range of 5 to 60%, a gas flux in the range of 10 to 1,500 liters/min.m² atm, the polyolefin is polypropylene, and the hollow fiber membrane has an average crimp amplitude in the range of 50 to 100% of the outside diameter, a maximum crimp amplitude/crimp half cycle period at maximum crimp amplitude ratio in the range of 0.02 to 0.05, and a crimp ratio in the range of 2.0 to 3.0%.

What is claimed is:

1. An oxygenator comprising:
   a container having a blood inlet, a blood outlet, an oxygen-containing gas inlet and an oxygen-containing gas outlet; and
   a plurality of hydrophobic porous hollow fiber membranes, housed within said container, for defining therein passages for an oxygen-containing gas between said oxygen-containing gas inlet and said oxygen-containing gas outlet, and for defining a passage for blood outside said fiber membranes between said blood inlet and said blood outlet, said fiber membranes having an inside diameter of 150 to 300 μm, a wall thickness of 10 to 150 μm, and a substantially circular cross-section, an average crimp amplitude of 50 to 120% of the outside diameter thereof, a ratio of the maximum crimp amplitude to a crimp half cycle period at the maximum crimp amplitude in the range of 0.01 to 0.1, and a crimp ratio of 1.0 to 3.0%.

2. An oxygenator according to claim 1, wherein said fiber membranes have a void ratio of 5 to 60%.

3. An oxygenator according to claim 2, wherein said average crimp amplitude is in the range of 50 to 100% of the outside diameter of said fiber membrane, said ratio of the maximum crimp amplitude to the crimp half cycle period at the maximum crimp amplitude is in the range of 0.02 to 0.05, and said crimp ratio is in the range of 2.0 to 3.0%.

4. An oxygenator according to claim 1, wherein said fiber membrane has an oxygen gas flux of 0.1 to 2,000 l/min.m².atm.

5. An oxygenator according to claim 1, wherein said inside diameter is in the range of 180 to 250 μm, and said wall thickness is in the range of 20 to 100 μm.

6. An oxygenator according to claim 1, wherein said fiber membrane is made of polypropylene.

7. An oxygenator according to claim 1, wherein said fiber membrane is made of polyolefin.

8. An oxygenator according to claim 1, wherein said fiber membrane has on the inner wall side a tightly packed layer in which minute polyolefin particles are intimately bound, and on the outer wall side a porous layer in which minute polyolefin particles are bound in a chain-like pattern, so that fine through-pores are formed in said fiber membrane between the inner and outer surfaces thereof.

9. An oxygenator according to claim 8, wherein said average crimp amplitude is in the range of 50 to 100% of the outside diameter of said fiber membrane, said ratio of the maximum crimp amplitude to the crimp half cycle period at the maximum crimp amplitude is in the range of 0.02 to 0.05, and said crimp ratio is in the range of 2.0 to 3.0%.

10. An oxygenator according to claim 1, wherein said fiber membrane has on the inner wall side thereof a continuous layer of densely fused polypropylene, said continuous layer having part of polypropylene particles being exposed, and on the outer wall side thereof and between the inner and outer wall sides a chained layer of a plurality of polypropylene chains extending in the axial direction of said fiber membrane, said fiber membrane containing fine pores which establish communication between the inner and outer sides in the form of a three-dimensional network.

11. An oxygenator according to claim 10, wherein said fiber membrane has a birefringence ratio in the axial direction of the fiber thereof in the range of 0.001 to 0.01.

12. An oxygenator according to claim 12, wherein said average crimp amplitude is in the range of 50 to 100% of the outside diameter of said fiber membrane, said ratio of the maximum crimp amplitude to the crimp half cycle period at the maximum crimp amplitude is in the range of 0.02 to 0.05, and said crimp ratio is in the range of 2.0 to 3.0%

* * * * *

UNITED STATES PATENT AND TRADEMARK OFFICE
CERTIFICATE OF CORRECTION

PATENT NO. : 5,489,382
DATED : February 6, 1996
INVENTOR(S) : Ken TATEBE et al

It is certified that error appears in the above-indentified patent and that said Letters Patent is hereby corrected as shown below:

In Column 2, line 64, start a new paragraph with "The hollow".
In Column 4, line 28, after "intimately", delete "are".
In Column 8, line 24, delete "-resins represented by such," and insert -- resins represented by such --.
In Column 13, line 4, start a new paragraph with "If this".
In Column 20, line 1, delete "membranes" and insert -- membrane --.
In Column 30, line 9, delete "led" and insert -- seed --.
In Column 30, line 65, delete "interpose(" and insert -- interposed --.
In Column 31, line 5, delete "10" and insert -- 100 --.

Signed and Sealed this

Third Day of September, 1996

*Attest:*

BRUCE LEHMAN

*Attesting Officer*         *Commissioner of Patents and Trademarks*